US011880106B2

(12) United States Patent
Sasaki et al.

(10) Patent No.: US 11,880,106 B2
(45) Date of Patent: Jan. 23, 2024

(54) DISPLAY DEVICE

(71) Applicant: Sharp Display Technology Corporation, Kameyama (JP)

(72) Inventors: Tomoo Sasaki, Kameyama (JP); Daisuke Teragawa, Kameyama (JP); Tomohiro Asamizu, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/125,682

(22) Filed: Mar. 23, 2023

(65) Prior Publication Data

US 2023/0305334 A1    Sep. 28, 2023

Related U.S. Application Data

(60) Provisional application No. 63/323,928, filed on Mar. 25, 2022.

(51) Int. Cl.
  *G02F 1/1333*    (2006.01)
  *G02F 1/1335*    (2006.01)
  *G02F 1/1362*    (2006.01)

(52) U.S. Cl.
  CPC .. *G02F 1/133612* (2021.01); *G02F 1/136286* (2013.01)

(58) Field of Classification Search
  None
  See application file for complete search history.

(56) References Cited

U.S. PATENT DOCUMENTS

| 5,983,290 | A   | * | 11/1999 | Obata   | G06F 1/1626  |
|-----------|-----|---|---------|---------|--------------|
|           |     |   |         |         | 710/14       |
| 2006/0087532 | A1 | * | 4/2006 | Takata  | B41J 2/17506 |
|           |     |   |         |         | 347/50       |
| 2007/0268444 | A1 | * | 11/2007 | Azuma  | G02F 1/133308 |
|           |     |   |         |         | 349/150      |
| 2008/0253091 | A1 | * | 10/2008 | Kato   | B41J 29/377  |
|           |     |   |         |         | 361/709      |
| 2011/0031628 | A1 | * | 2/2011 | Takada  | G11C 5/04    |
|           |     |   |         |         | 257/773      |
| 2011/0122356 | A1 | * | 5/2011 | Saimen  | H05K 1/0269  |
|           |     |   |         |         | 349/149      |

FOREIGN PATENT DOCUMENTS

JP          2007310184 A    11/2007

* cited by examiner

*Primary Examiner* — Sang V Nguyen
(74) *Attorney, Agent, or Firm* — ScienBiziP, P.C.

(57) ABSTRACT

A display device includes a display panel, a backlight, at least one first circuit substrate having at least one first connector, a second circuit substrate having at least one second connector, and at least one flexible flat cable (FFC). By bending at a plurality of bending positions, one of a front face and a back face at a first end of the at least one FFC faces the backlight side and another of the front face and the back face at a second end of the at least one FFC faces the backlight side. The first end is connected to the at least one first connector, and the second end is connected to the at least one second connector.

20 Claims, 21 Drawing Sheets

DISPLAY DEVICE

CROSS-REFERENCE TO RELATED APPLICATION

The present application claims priority from Provisional Application No. 63/323,928, the content of which is hereby incorporated by reference into this application.

BACKGROUND OF THE INVENTION

1. Field of the Invention

The present disclosure relates to a display device.

2. Description of the Related Art

Japanese Unexamined Patent Application Publication No. 2007-310184 discloses a configuration in which a control board and a circuit substrate for a drive system are connected via a flexible printed cable in a liquid crystal display device.

A liquid crystal display device includes a display panel including a color filter substrate (CF substrate) and an active matrix substrate (TFT substrate), a backlight that illuminates the display panel, a first circuit substrate for a drive system, and a second circuit substrate that is a control board. The first circuit substrate is connected to an end portion of a face facing the CF substrate in the TFT substrate (hereinafter referred to as "face facing the CF") via a flexible wiring substrate. The second circuit substrate is connected to the first circuit substrate via an FFC.

In a known general method, the TFT substrate is disposed closer to the backlight than the CF substrate in the liquid crystal display device. In a known configuration in which the TFT substrate is disposed closer to the backlight than the CF substrate, a face facing the CF in the TFT substrate faces the viewer side, and accordingly a front face of the first circuit substrate (connector mounting face) faces an opposite side of the backlight side. Thus, the connection work of the FFC can be performed with a front face of the second circuit substrate (connector mounting face) facing the opposite side of the backlight side (i.e., with the connector visible to the operator).

On the other hand, the inventor's study revealed that malfunction may occur in the TFT substrate as the luminance of the backlight increases, and the inventor found that disposing the CF substrate closer to the backlight than the TFT substrate is effective as a countermeasure against the malfunction. In a new configuration in which the CF substrate is disposed closer to the backlight than the TFT substrate, the face facing the CF in the TFT substrate faces the backlight side, and accordingly the front face of the first circuit substrate (connector mounting face) faces the backlight side. When the second circuit substrate is connected via the FFC to the first circuit substrate whose front face faces the backlight side, it is usually necessary to connect the FFC with the front face of the second circuit substrate facing the backlight side (i.e., in a state in which the connector cannot be seen by the operator), thereby reducing the work efficiency.

SUMMARY

According to the present disclosure, a display device includes a display panel, a backlight configured to illuminate the display panel, at least one first circuit substrate including at least one first connector and disposed near the backlight with a front face of the at least one first circuit substrate on which the at least one first connector is mounted facing a backlight side, a second circuit substrate being a circuit substrate that includes at least one second connector and is disposed near the backlight with a back face opposite to a front face of the second circuit substrate on which the at least one second connector is mounted facing the backlight side, and being connected to the display panel via the at least one first circuit substrate, and at least one flexible flat cable (FFC) connecting the at least one first circuit substrate and the second circuit substrate, in which by bending at a plurality of bending positions, one of a front face and a back face at a first end of the at least one FFC faces the backlight side and another of the front face and the back face at a second end of the at least one FFC faces the backlight side, the first end is connected to the at least one first connector, and the second end is connected to the at least one second connector.

In one aspect of the present disclosure, even when the front face of the first circuit substrate faces the backlight side, the connection work of the FFC can be performed with the front face of the second circuit substrate facing the opposite side of the backlight side, thereby suppressing a decrease in work efficiency in manufacturing the display device.

DETAILED DESCRIPTION OF THE INVENTION

First Embodiment

Figure 1A:
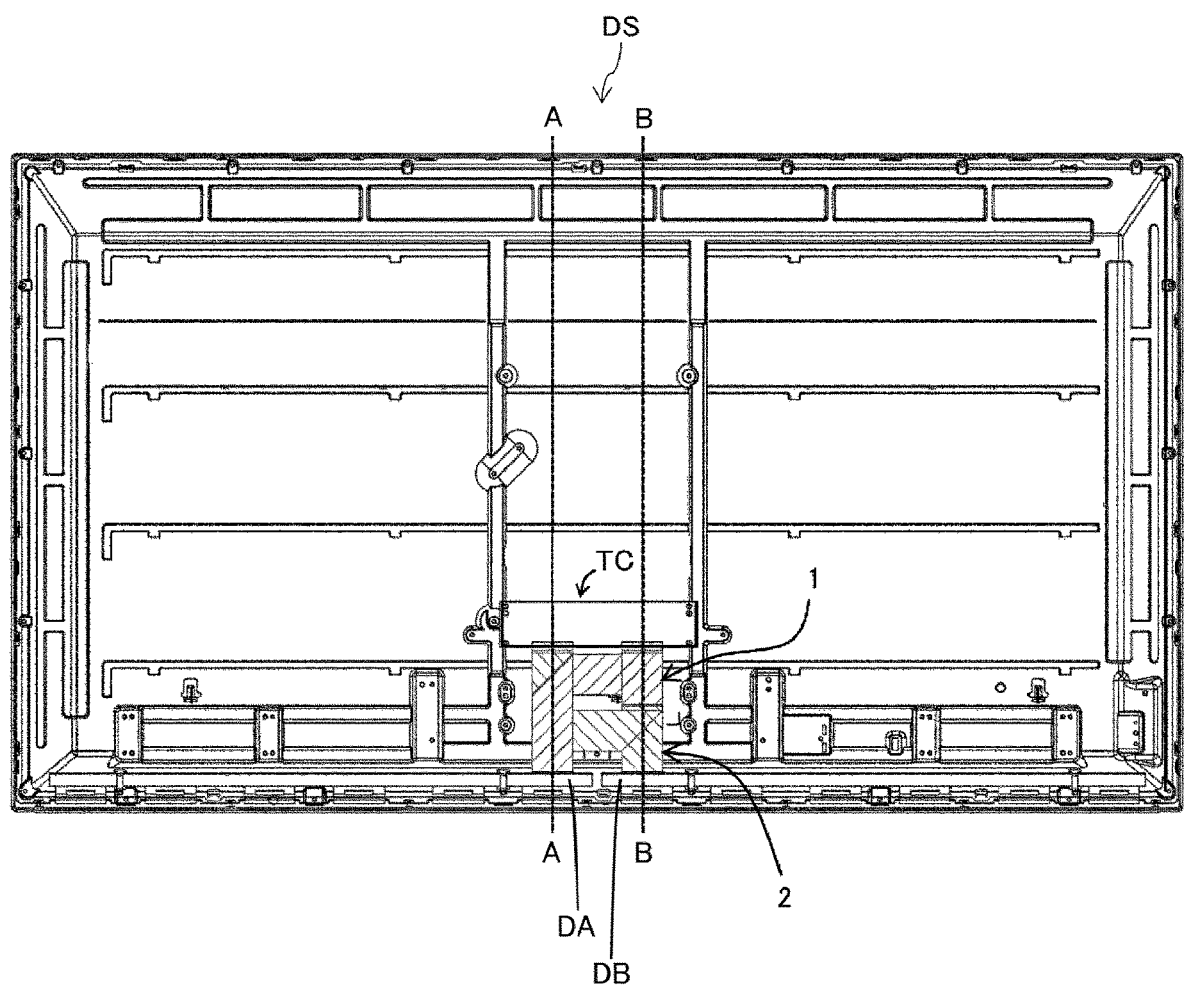
FIG. 1A is a plan view illustrating a back face configuration of a display device according to the present embodiment.
Figure 1B:
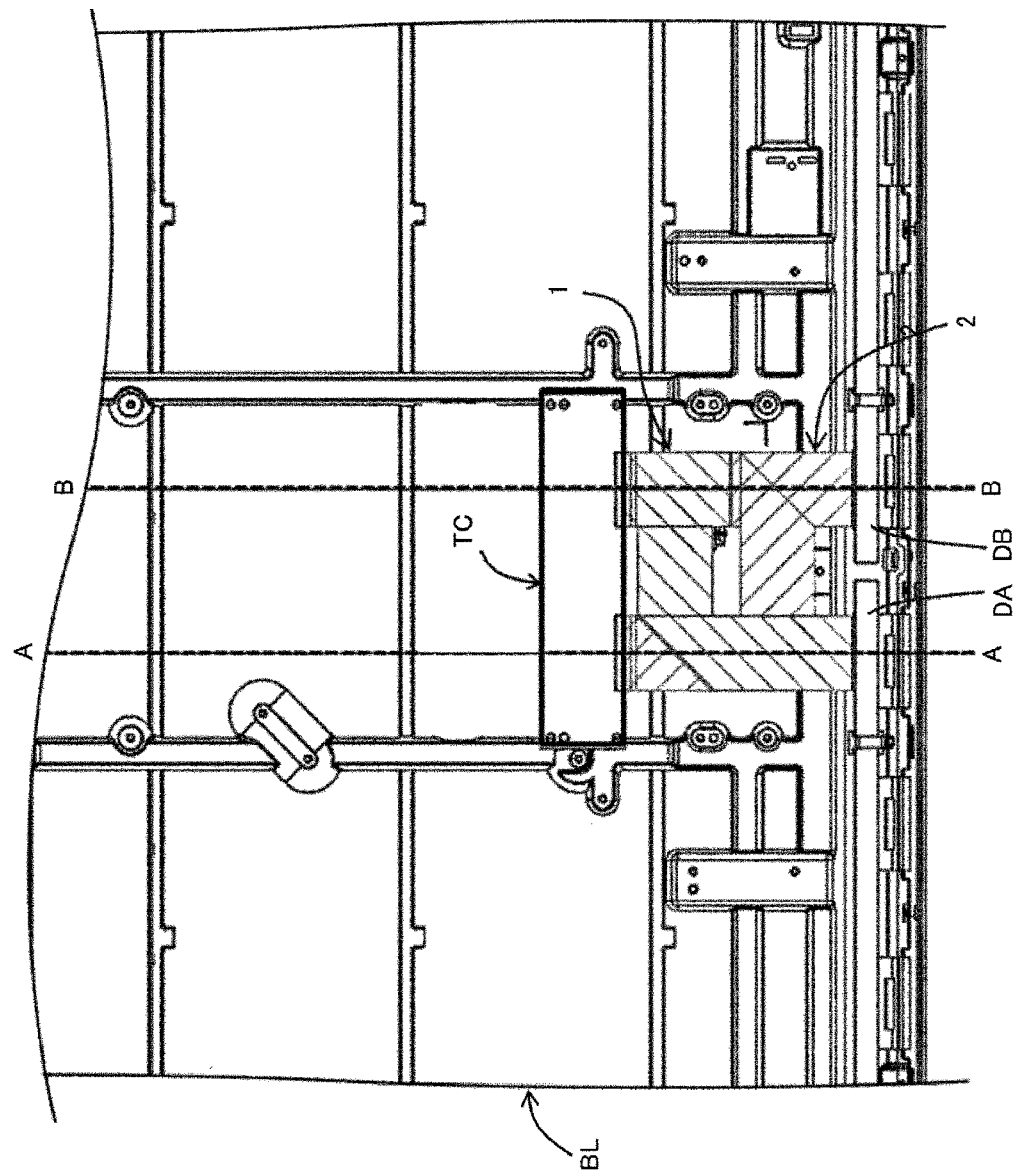
FIG. 1B is an enlarged view of part of FIG. 1A.
Figure 2:
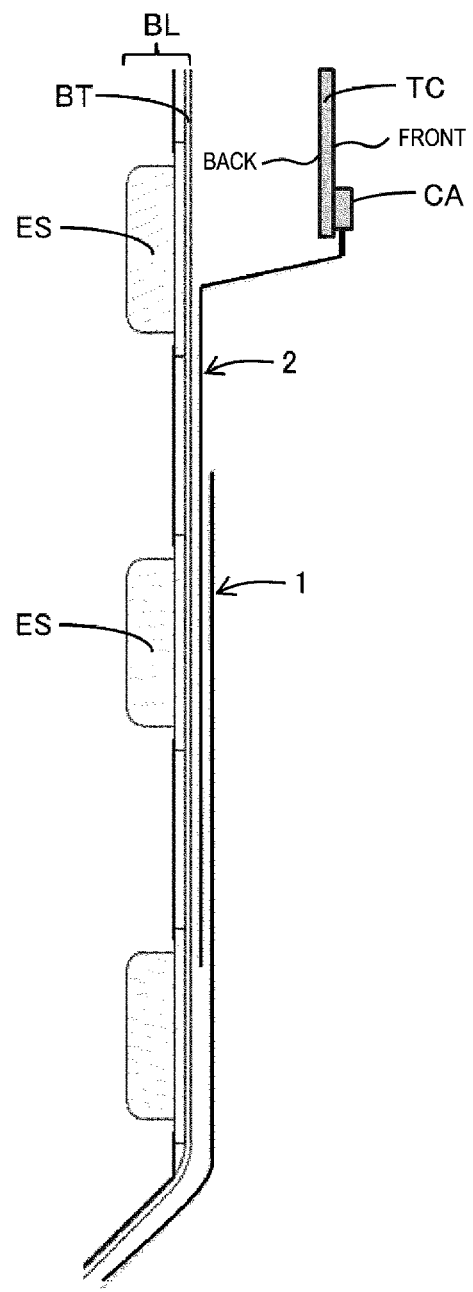
FIG. 2 is a cross-sectional view illustrating part of a cross section taken along a line A-A in FIG. 1B.
Figure 3:
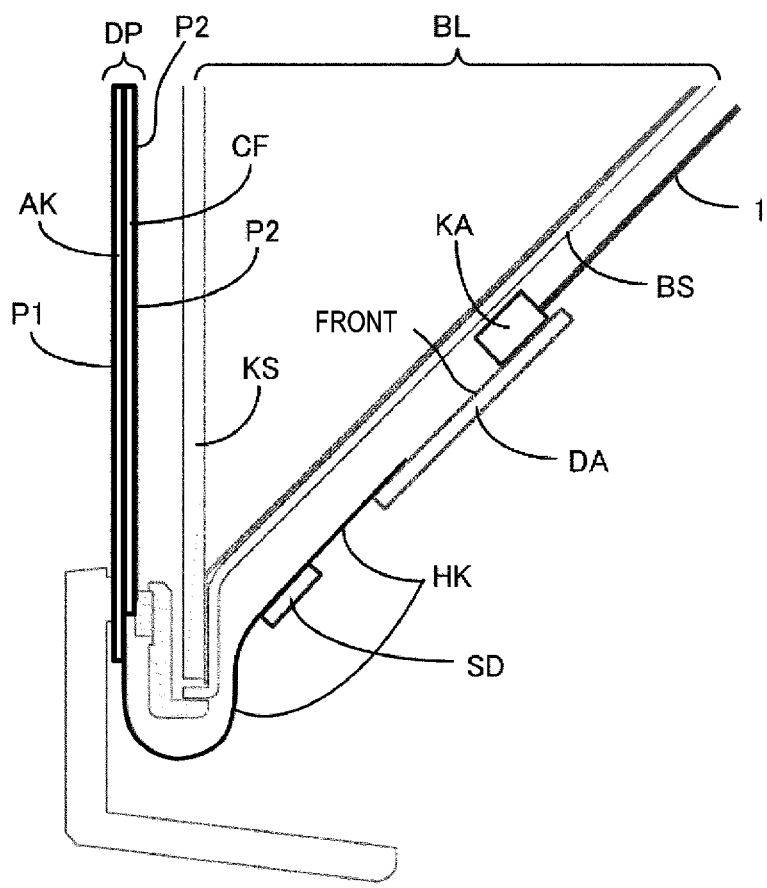
FIG. 3 is a cross-sectional view illustrating part (lower part) of the cross section taken along the line A-A in FIG. 1B.
Figure 4:
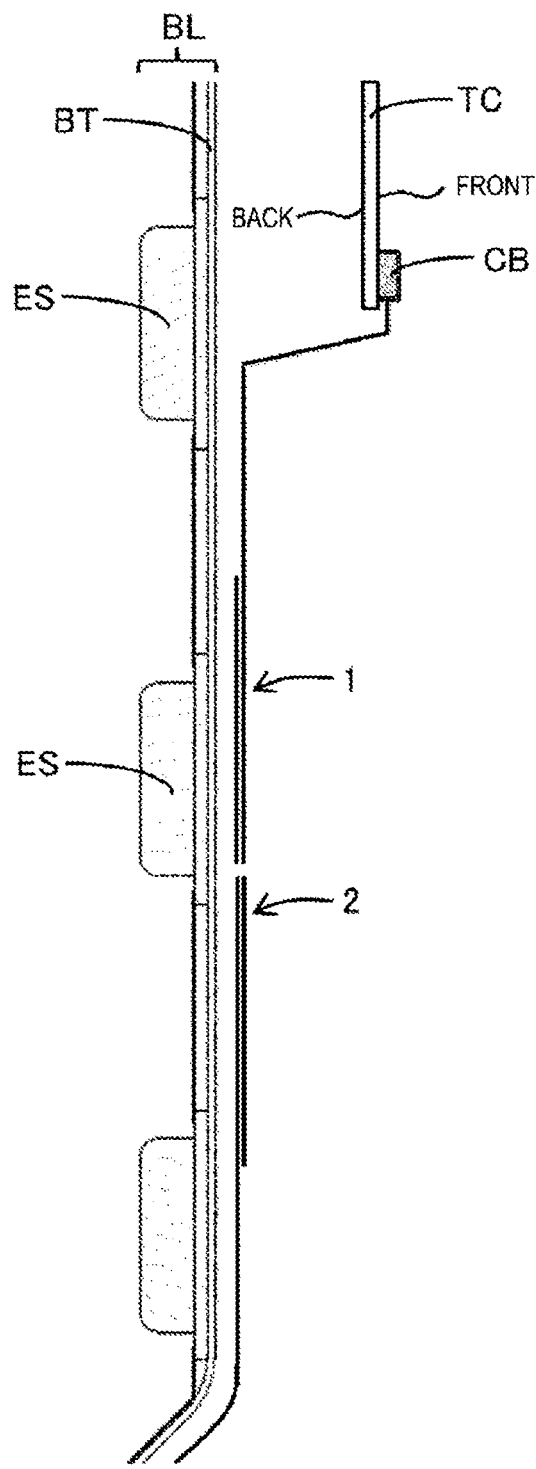
FIG. 4 is a cross-sectional view illustrating part of a cross section taken along a line B-B in FIG. 1B.
Figure 5:
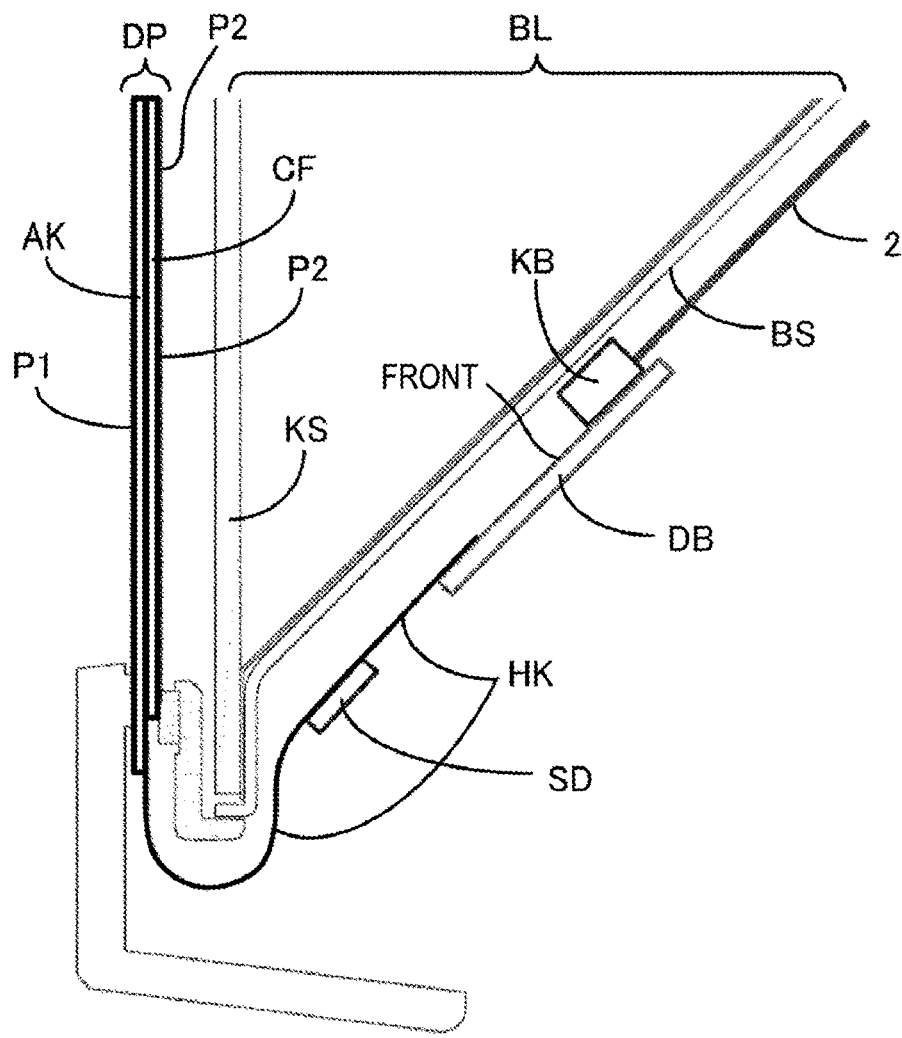
FIG. 5 is a cross-sectional view illustrating part (lower part) of the cross section taken along the line B-B in FIG. 1B.

FIG. 1A is a plan view illustrating a back face configuration of a display device according to the present embodiment. FIG. 1B is an enlarged view of part of FIG. 1A. FIG. 2 is a cross-sectional view illustrating part of a cross section taken along a line A-A in FIG. 1B. FIG. 3 is a cross-sectional view illustrating part (lower part) of the cross section taken along the line A-A in FIG. 1B. FIG. 4 is a cross-sectional view illustrating part of a cross section taken along a line B-B in FIG. 1B. FIG. 5 is a cross-sectional view illustrating part (lower part) of the cross section taken along the line B-B in FIG. 1B. As illustrated in FIGS. 1A and 1B and 2 to 5, a display device DS according to the present embodiment includes a display panel DP, a backlight BL that illuminates the display panel DP, at least one (two in the present embodiment) first circuit substrate DA, DB, a second circuit substrate TC, and at least one (two in the present embodiment) flexible flat cable (FFC) 1, 2.

As illustrated in FIGS. 3 and 5, the display panel DP includes a first polarizer P1, an active matrix substrate AK (TFT substrate), a liquid crystal layer, a color filter substrate CF, and a second polarizer P2 in this order from a front face side of the device (viewing side) to a back face side of the device. The liquid crystal layer is sandwiched between the active matrix substrate AK and the color filter substrate CF. The color filter substrate CF is disposed closer to the backlight BL than the active matrix substrate AK. The backlight BL includes a light source ES (see FIGS. 2 and 4), backlight chassis BT and BS, and an optical layer KS. The optical layer KS includes, for example, a diffuser sheet and is disposed at a position closest to the display panel DP in the backlight BL. Hereinafter, a bottom portion of the backlight chassis is referred to as "backlight bottom portion BT", and a side portion of the backlight chassis is referred to as "backlight side portion BS". In the display device DS according to the present embodiment, the light emitted from the backlight BL passes through the color filter substrate CF before entering the active matrix substrate AK, so the intensity of the light incident on the active matrix substrate AK is reduced. This can suppress malfunction of the active matrix substrate AK.

The first circuit substrate DA, DB is at least one (two in the present embodiment) source substrate among a plurality of source substrates included in the display device DS that is connected to the second circuit substrate TC via FFC 1, 2. The first circuit substrates DA and DB are provided near the backlight BL (the backlight side portion BS in the present embodiment), and are connected to an end portion of the active matrix substrate AK via a flexible wiring substrate HK on which a source driver SD is mounted. The at least one first circuit substrate DA, DB includes at least one (two in the present embodiment) first connector KA, KB. In the present embodiment, of the two first circuit substrates DA and DB, one first circuit substrate DA includes the first connector KA, and the other first circuit substrate DB includes the first connector KB. One first circuit substrate may include a plurality of first connectors. The first circuit substrate DA, DB is disposed so that front face thereof (face marked as "FRONT" in the figures) on which the first connector KA, KB is mounted face the backlight BL side. One end of the flexible wiring substrate HK is connected to an end portion of a face facing the CF in the active matrix substrate AK (an overhanging portion not facing the color filter substrate CF), and the other end of the flexible wiring substrate HK is connected to an end portion of face (front face) of the first circuit substrate DA, DB on the backlight BL side.

The second circuit substrate TC is a control board, for example, a timing control board on which a timing controller is mounted. As illustrated in FIGS. 2 and 4, the second circuit substrate TC is provided near the backlight BL (the backlight bottom portion BT in the present embodiment), and is connected to the display panel DP via the FFCs 1 and 2, the first circuit substrates DA and DB, and the flexible wiring substrate HK. The second circuit substrate TC includes at least one (two in the present embodiment) second connector CA, CB. The second circuit substrate TC is disposed so that a back face (face marked as "BACK" in the figures) opposite to a front face (face marked as "FRONT" in the figures) on which the second connectors CA and CB are mounted faces the backlight BL side. That is, the front face of the second circuit substrate TC faces an opposite side of the backlight BL side.

The above-described configuration of the display device DS is substantially the same in other embodiments. Configurations of the FFCs 1 and 2 according to the present embodiment will be specifically described below.

Figure 6:
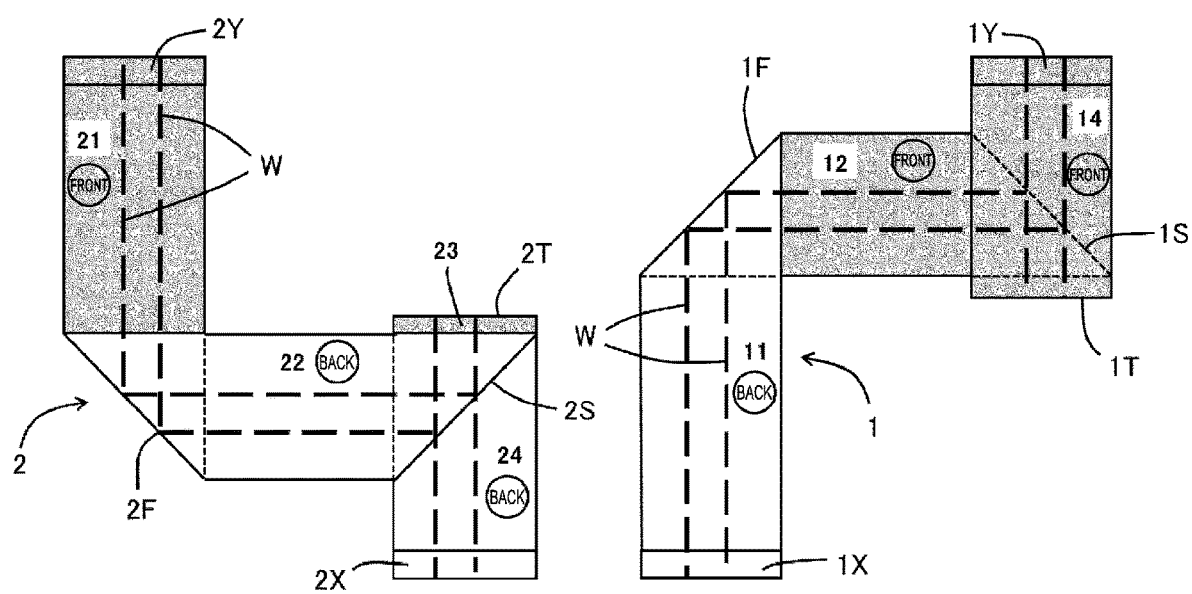
FIG. 6 is a plan view illustrating configurations of FFCs according to a first embodiment.
Figure 7:
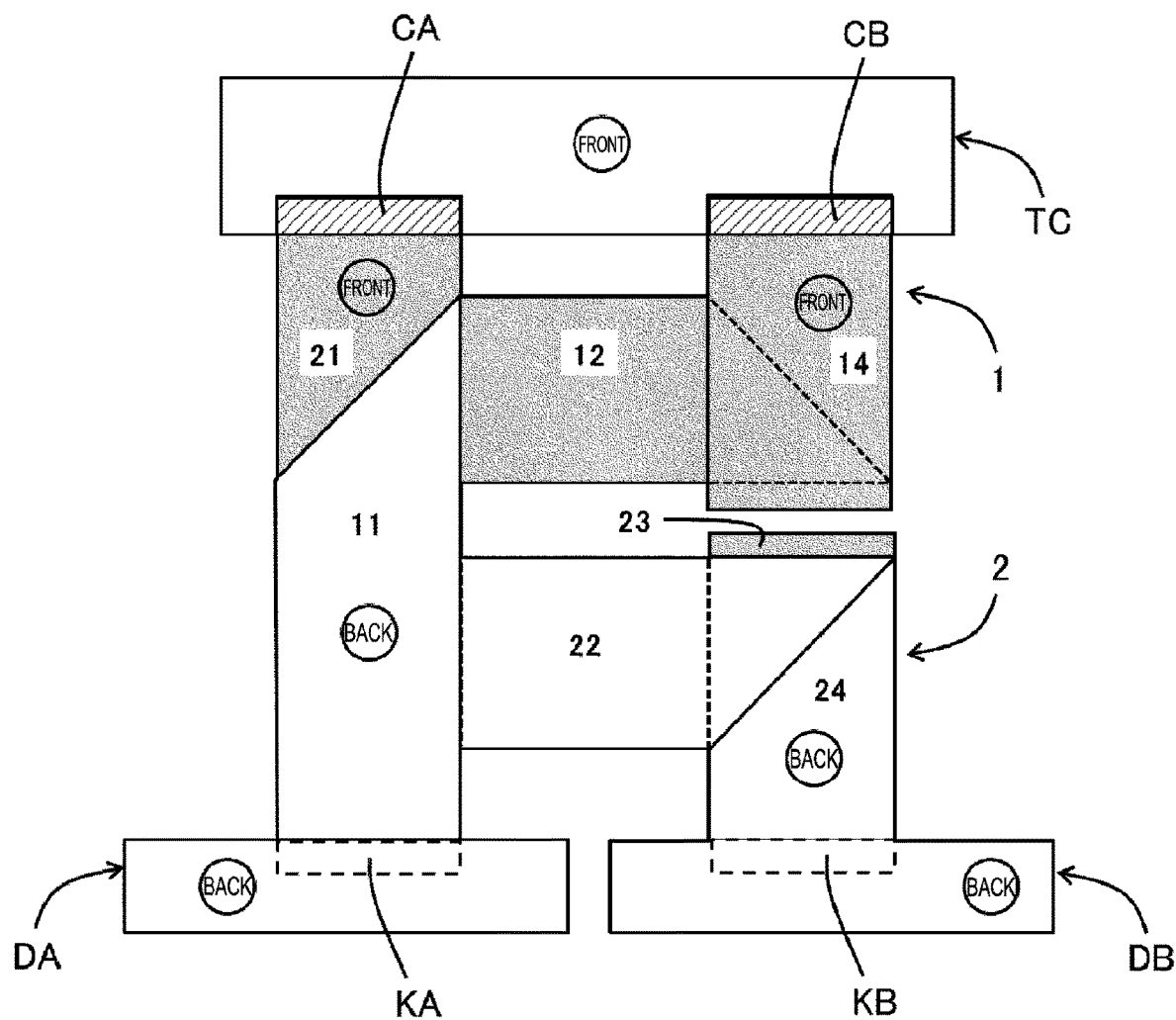
FIG. 7 is a plan view illustrating a connection state of first circuit substrates and a second circuit substrate according to the first embodiment.

FIG. 6 is a plan view illustrating configurations of the FFCs according to a first embodiment. FIG. 7 is a plan view illustrating a connection state of the first circuit substrates and the second circuit substrate according to the first embodiment. As illustrated in FIGS. 6 and 7, the first circuit substrate DA and the second circuit substrate TC are connected via the FFC 1. The FFC 1 is bent at a plurality of (three in the present embodiment) bending positions so that one of front and back faces (the front face in the present embodiment) at a first end 1X thereof faces the backlight BL side (the back side of the paper in FIG. 7) and the other of the front and back faces (the back face in the present embodiment) at a second end 1Y thereof faces the backlight BL side, and the first end 1X is connected to the first connector KA and the second end 1Y is connected to the second connector CB. In the FFC 1, an end portion (one end of the FFC 1) included in a first portion 11 described later is the first end 1X, and an end portion (the other end of the FFC 1) included in a fourth portion 14 described later is the second end 1Y. The FFC 1 includes a plurality of wiring lines W (some wiring lines are illustrated in the figure). The plurality of wiring lines W extend in parallel from the first end 1X to the second end 1Y of the FFC 1. In the FFC 1, the front face thereof (gray portion in the figure) is a shield face, and the back face thereof (white portion in the figure) is a non-shielded face.

As illustrated in FIGS. 6 and 7, the first circuit substrate DB and the second circuit substrate TC are connected via the FFC 2. The FFC 2 is bent at a plurality of (three as in the FFC 1) bending positions so that one of front and back faces (the front face as in the FFC 1) at a first end 2X thereof faces the backlight BL side and the other of the front and back faces (the back face as in the FFC 1) at a second end 2Y thereof faces the backlight BL side, and the first end 2X is connected to the first connector KB and the second end 2Y is connected to the second connector CA. In the FFC 2, an end portion (one end of the FFC 2) included in a first portion 21 described later is the second end 2Y, and an end portion (the other end of the FFC 2) included in a fourth portion 24 described later is the first end 2X. Similar to the FFC 1, the FFC 2 includes a plurality of wiring lines W. The plurality of wiring lines W extend in parallel from the first end 2X to the second end 2Y of the FFC 2. In the FFC 2, the front face thereof (gray portion in the figure) is a shield face, and the back face thereof (white portion in the figure) is a non-shielded face.

Figure 8:
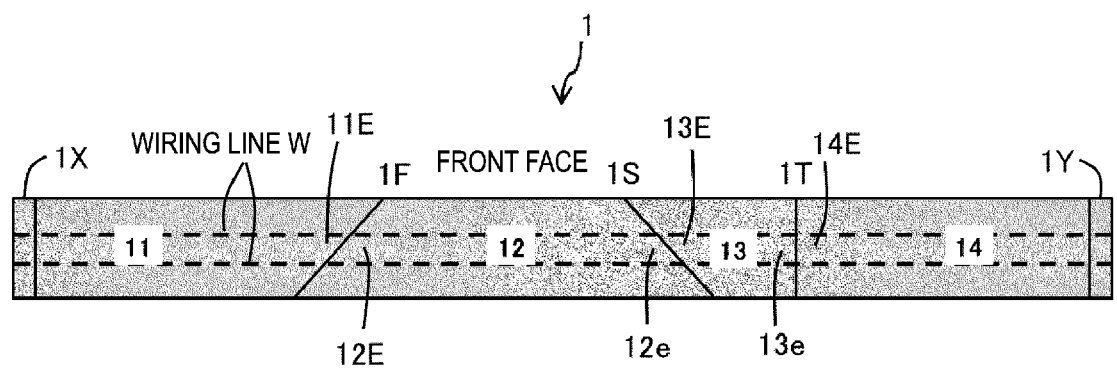
FIG. 8 is a plan view illustrating a method of bending the FFC.
Figure 9:
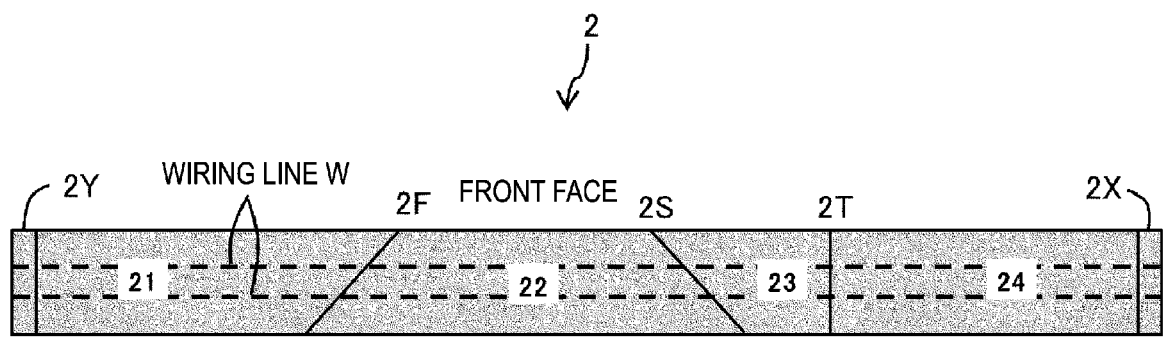
FIG. 9 is a plan view illustrating a method of bending the FFC.

FIGS. 8 and 9 are plan views illustrating methods of bending the FFCs. As illustrated in FIGS. 6 and 8, the plurality of bending positions of the FFC 1 includes three bending positions: a first bending position 1F, a second bending position 1S, and a third bending position 1T. The FFC 1 includes the first portion 11 from the one end (first end 1X) to the first bending position 1F, a second portion 12 from the first bending position 1F to the second bending position 1S, a third portion 13 from the second bending position 1S to the third bending position 1T, and the fourth portion 14 from the third bending position 1T to the other end (second end 1Y). The FFC 1 is bent at the three bending positions 1F, 1S, and 1T so that the front faces of the first portion 11 and the third portion 13 and the back faces of the second portion 12 and the fourth portion 14 face the backlight BL side.

As illustrated in FIGS. 6 and 9, the plurality of bending positions of the FFC 2 includes three bending positions: a first bending position 2F, a second bending position 2S, and a third bending position 2T. The FFC 2 includes the first portion 21 from the one end (second end 2Y) to the first bending position 2F, a second portion 22 from the first bending position 2F to the second bending position 2S, a third portion 23 from the second bending position 2S to the third bending position 2T, and the fourth portion 24 from the third bending position 2T to the other end (first end 2X). The FFC 2 is bent at the three bending positions 2F, 2S, and 2T so that the back faces of the first portion 21 and the third portion 23 and the front faces of the second portion 22 and the fourth portion 24 face the backlight BL side.

Thus, the FFC 1 and the FFC 2 have the same length and are bent in the same manner. Since the same kind of FFCs having the same bent shape are used as the plurality of FFCs 1 and 2, the cost can be reduced. The FFC 1 and the FFC 2 are connected to the first circuit substrates DA and DB and the second circuit substrate TC with the front and back faces thereof being reversed to each other. Since the FFC 1 and the FFC 2 are bent in the same manner, the bending method will be described in detail below using the FFC 1 as an example.

The FFC 1 has the plurality of wiring lines W extending in parallel from the first end 1X to the second end 1Y. When the FFC 1 is bent, the plurality of wiring lines W are as follows. That is, when an end portion 11E of the first portion 11 on the second portion 12 side is viewed in a plan view, a direction of the wiring line (a direction in which the wiring line extends) at the end portion 11E is substantially orthogonal to a direction of the wiring line at an end portion 12E of the second portion 12 on the first portion 11 side. When an end portion 12e of the second portion 12 on the third portion 13 side is viewed in a plan view, a direction of the wiring line at the end portion 12e is substantially orthogonal to a direction of the wiring line at an end portion 13E of the third portion 13 on the second portion 12 side. When an end portion 13e of the third portion 13 on the fourth portion 14 side is viewed in a plan view, a direction of the wiring line at the end portion 13e is substantially antiparallel to a direction of the wiring line at an end portion 14E of the fourth portion 14 on the third portion 13 side.

As illustrated in FIGS. 6 and 8, the FFC 1 is bent at the first bending position 1F so that a part of the front face of the first portion 11 and a part of the front face of the second portion 12 face each other. In FIG. 6, the part of the first portion 11 that overlaps the second portion 12 is on the front side of the second portion 12 on the paper. The FFC 1 is bent at the second bending position 1S so that another part of the front face of the second portion 12 and a part of the front face of the third portion 13 face each other. In FIG. 6, the part of the third portion 13 that overlaps the second portion 12 is on the front side of the second portion 12 on the paper. The FFC 1 is bent at the third bending position 1T so that the back face of the third portion 13 and a part of the back face of the fourth portion 14 face each other. In FIG. 6, the part of the fourth portion 14 that overlaps the third portion 13 is on the front side of the third portion 13 on the paper. Shapes of the first portion 11, the second portion 12, and the third portion 13 are each trapezoidal, and a shape of the fourth portion 14 is rectangular.

In the present embodiment, different wiring lines cross each other in a part where shield faces (front faces) face each other, and the same wiring lines overlap in a part where non-shielded faces (back faces) face each other. In this way, interference between the different wiring lines can be reduced by preventing the different wiring lines from crossing each other in the part where the non-shielded faces (back faces) face each other.

As illustrated in FIG. 7, the first circuit substrates DA and DB and the second circuit substrate TC are connected via the FFCs 1 and 2. To be specific, the first end 1X of the FFC 1 is connected to one of the two first connectors KA and KB (the first connector KA on the left side in the figure), and the second end 1Y of the FFC 1 is connected to one of the two second connectors CA and CB (the second connector CB on the right side in the figure). The first end 2X of the FFC 2 is connected to the other of the two first connectors KA and KB (the first connector KB on the right side in the figure), and the second end 2Y of the FFC 2 is connected to the other of the two second connectors CA and CB (the second connector CA on the left side in the figure). In this way, the FFC 1 and the FFC 2 are disposed so as to intersect each other and are connected to the first circuit substrates DA and DB and the second circuit substrate TC.

The FFC 1 is superposed on the FFC 2 so that the back face of the part of the second portion 12 of the FFC 1 that overlaps the first portion 11 (hereinafter referred to as "first overlapping portion") faces the front face of the first portion 21 of the FFC 2, and the back face of a part of the second portion 22 of the FFC 2 that overlaps the first portion 21 (hereinafter referred to as "second overlapping portion") faces the front face of the first portion 11 of the FFC 1. The third portion 13 and the fourth portion 14 of the FFC 1 are not superposed on any part of the FFC 2, and the third portion 23 and the fourth portion 24 of the FFC 2 are not superposed on any part of the FFC 1. The entire back face of the first overlapping portion does not necessarily have to face the front face of the first portion 21 of the FFC 2. For example, the FFC 1 may be superposed on the FFC 2 with a slight shift so that a part of the back face of the first overlapping portion does not face the front face of the first portion 21 of the FFC 2. Similarly, the entire back face of the second overlapping portion does not necessarily have to face the front face of the first portion 11 of the FFC 1. For example, the FFC 1 may be superposed on the FFC 2 with a slight shift, so that a part of the back face of the second overlapping portion does not face the front face of the first portion 11 of the FFC 1. The same applies to other embodiments.

Thus, in the present embodiment, the FFC 1 is superposed on the FFC 2 so that non-shielded faces (back faces) thereof do not face each other. Thus, interference between the wiring lines can be reduced. By superposing the FFC 1 on the FFC 2 so that the first overlapping portion of the FFC 1 are not superposed on the second overlapping portion of the FFC 2, the total thickness of the FFCs 1 and 2 can be reduced. Further, the connection relationship between a plurality of terminals included in the first connectors KA and KB and a plurality of terminals included in the second connectors CA and CB is the same as in a known case in which the FFCs are directly connected without being bent with the front faces of the first circuit substrates and the front face of the second circuit substrate facing the same side. Therefore, there is no need to perform special processing such as left-right inversion of the image.

In the FFC 1, a shape of the part of the second portion 12 overlapping the first portion 11 (first overlapping portion) is triangular, a shape of the part of the third portion 13 overlapping the second portion 12 is triangular, and a shape of the part of the fourth portion 14 overlapping the third portion 13 is trapezoidal. In the FFC 2, a shape of the part of the second portion 22 overlapping the first portion 21 (second overlapping portion) is triangular, a shape of a part of the third portion 23 overlapping the second portion 22 is triangular, and a shape of a part of the fourth portion 24 overlapping the third portion 23 is trapezoidal.

According to the first embodiment, FFCs 1 and 2 are bent at the plurality of (three in the present embodiment) bending positions so that ones of the front and back faces (the front faces in the present embodiment) at the first ends 1X and 2X thereof face the backlight BL side and the others of the front and back faces (the back faces in the present embodiment) at the second ends 1Y and 2Y face the backlight BL side, and are disposed to intersect each other, with the first ends 1X and 2X connected to the first connectors KA and KB and the second ends 1Y and 2Y connected to the second connectors CB and CA. This allows the second ends 1Y and 2Y of the FFCs 1 and 2 to be inserted into the second connectors CA and CB of the second circuit substrate TC with the front face of the second circuit substrate TC facing the opposite side of the backlight BL side (i.e., with the front face facing the operator), even when the front faces of the first circuit substrates DA and DB face the backlight BL side, as in a display device DS in which the color filter substrate CF is located closer to the backlight BL than the active matrix substrate AK. Therefore, the operator can connect the FFCs 1 and 2 to the second connectors CA and CB, while looking at the second connectors CA and CB of the second circuit substrate TC, thereby suppressing a decrease in work efficiency. The first ends 1X and 2X of FFCs 1 and 2 are preferably attached to the first circuit substrates DA and DB before the first circuit substrates DA and DB are mounted.

Second Embodiment

Figure 10:
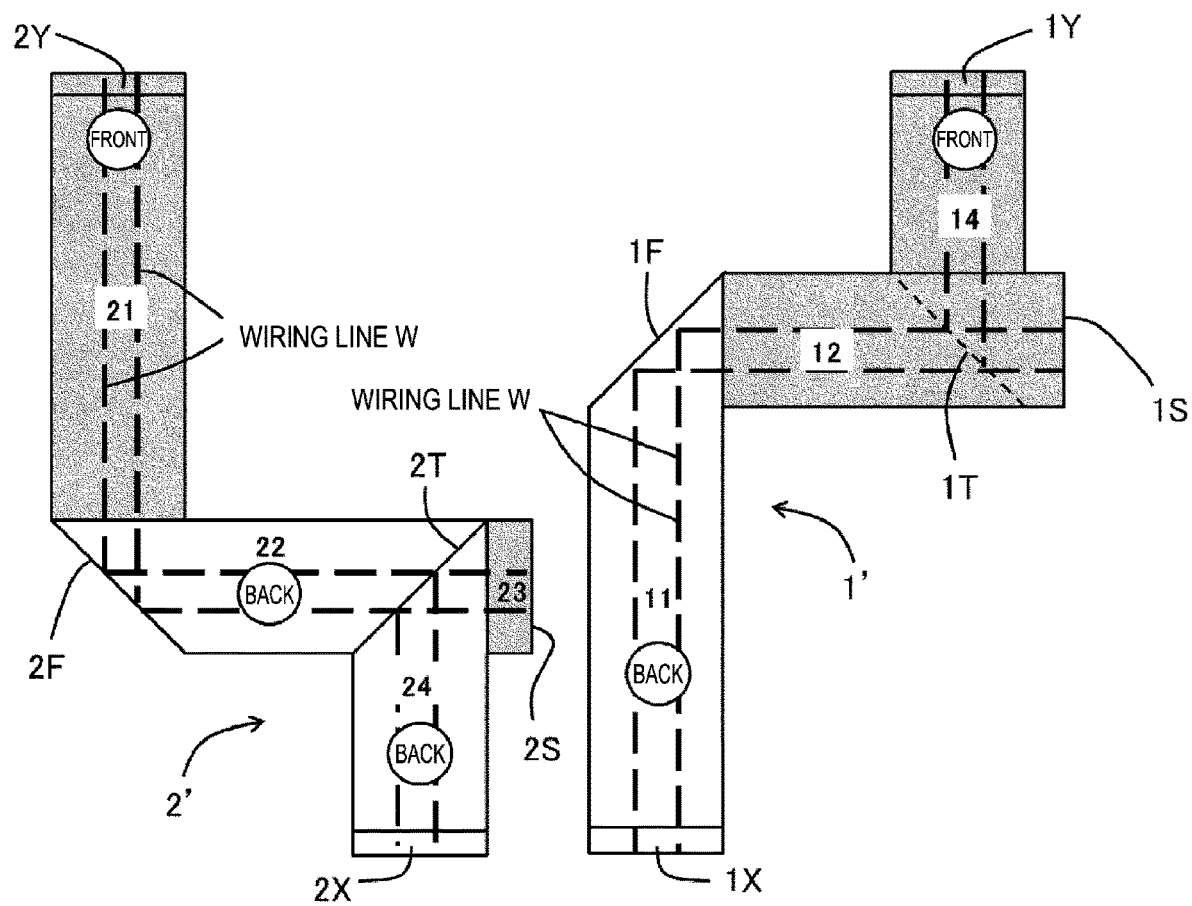
FIG. 10 is a plan view illustrating other configurations of FFCs.
Figure 11:
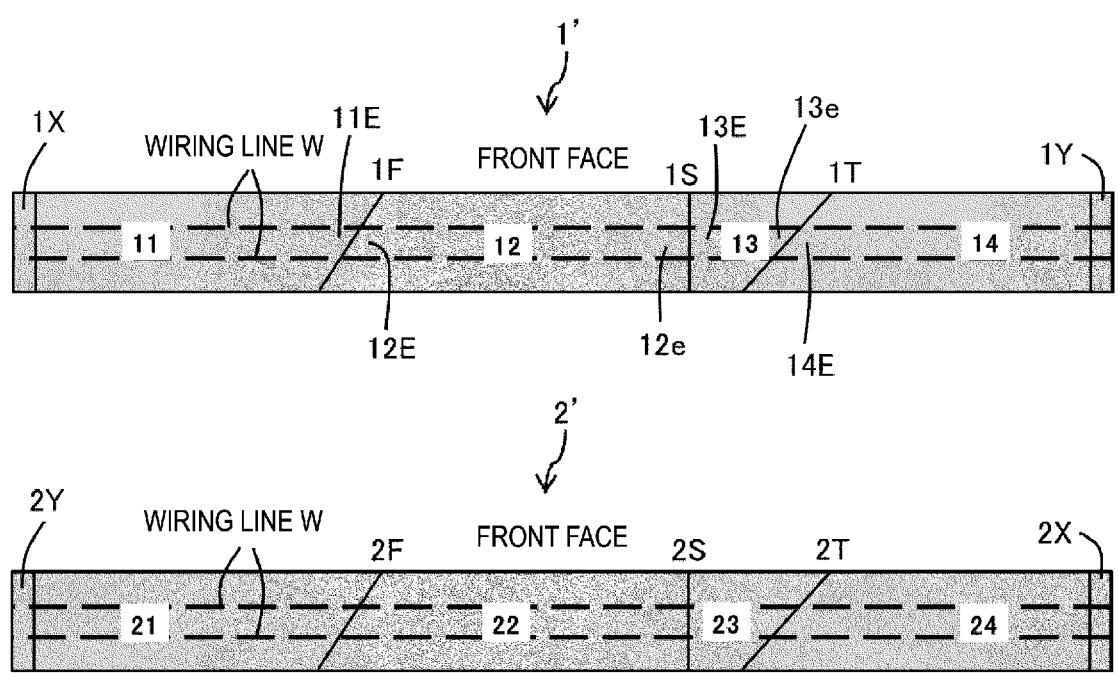
FIG. 11 is a plan view illustrating other methods of bending the FFCs.

FIG. 10 is a plan view illustrating other configurations of FFCs. FIG. 11 is a plan view illustrating other methods of bending the FFCs. Constituent elements of FFCs 1' and 2' according to a second embodiment are denoted by the same reference numerals as the constituent elements of the FFCs 1 and 2 according to the first embodiment. The FFCs 1' and 2' according to the second embodiment are different from the FFCs 1 and 2 according to the first embodiment in the manner of bending at second bending positions 1S and 2S and third bending positions 1T and 2T. Hereinafter, differences from the first embodiment will be mainly described using the FFC 1' as an example.

When the FFC 1' is bent, a plurality of wiring lines W are as follows. That is, when an end portion 11E of a first portion 11 on the second portion 12 side is viewed in a plan view, a direction of the wiring line (a direction in which the wiring line extends) at the end portion 11E is substantially orthogonal to a direction of the wiring line at an end portion 12E of a second portion 12 on the first portion 11 side. When an end portion 12e of the second portion 12 on the third portion 13 side is viewed in a plan view, a direction of the wiring line at the end portion 12e is substantially antiparallel to a direction of the wiring line at an end portion 13E of a third portion 13 on the second portion 12 side. When an end portion 13e of the third portion 13 on the fourth portion 14 side is viewed in a plan view, a direction of the wiring line at the end portion 13e is substantially orthogonal to a direction of the wiring line at an end portion 14E of a fourth portion 14 on the third portion 13 side.

As illustrated in FIGS. 10 and 11, the FFC 1' is bent at a first bending position 1F so that a part of a front face of the first portion 11 and a part of a front face of the second portion 12 face each other. In FIG. 10, the part of the first portion 11 that overlaps the second portion 12 is on the front side of the second portion 12 on the paper. The FFC 1' is bent at the second bending position 1S so that a part of a back face of the second portion 12 and a back face of the third portion 13 face each other. In FIG. 10, the part of the second portion 12 that overlaps the third portion 13 is on the front side of the third portion 13 on the paper. The FFC 1' is bent at the third bending position 1T so that a part of a front face of the third portion 13 and a part of a front face of the fourth portion 14 face each other. In FIG. 10, the part of the third portion 13 that overlaps the fourth portion 14 is on the front side of the fourth portion 14 on the paper. Shapes of the first portion 11, the second portion 12, the third portion 13, and the fourth portion 14 of the FFC 1' are each trapezoidal.

In the FFCs 1' and 2' according to the second embodiment, as in the FFCs 1 and 2 according to the first embodiment, different wiring lines cross each other in a part where shield faces (front faces) face each other, and the same wiring lines overlap in a part where non-shielded faces (back faces) face each other. In this way, interference between the different wiring lines can be reduced by preventing the different wiring lines from crossing each other in the part where the non-shielded faces (back faces) face each other.

Figure 12:
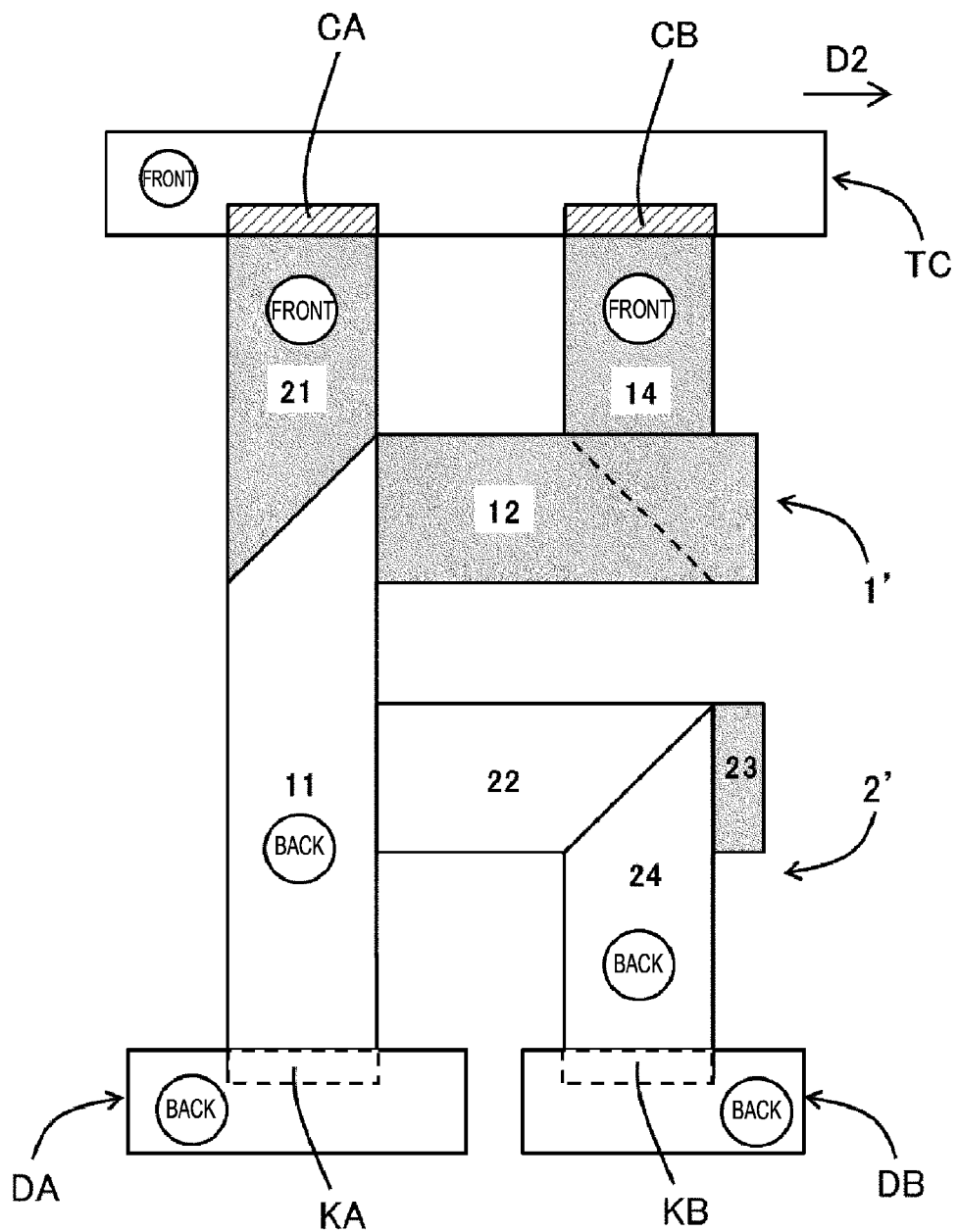
FIG. 12 is a plan view illustrating another connection state of first circuit substrates and a second circuit substrate according to a second embodiment.

FIG. 12 is a plan view illustrating a connection configuration of a first circuit substrate and a second circuit substrate according to the second embodiment. First connectors KA and KB to which first ends 1X and 2X of the FFCs 1' and 2' are connected and second connectors CA and CB to which second ends 1Y and 2Y are connected are the same as in the first embodiment. The FFCs 1' and 2' according to the second embodiment are arranged so as to intersect each other in the same manner as the FFCs 1 and 2 according to the first embodiment. The FFC 1' is superposed on the FFC 2' so that the back face of the part of the second portion 12 of the FFC 1' that overlaps the first portion 11 (first overlapping portion) faces a front face of a first portion 21 of the FFC 2' and a back face of a part of a second portion 22 of the FFC 2' that overlaps the first portion 21 (second overlapping portion) faces the front face of the first portion 11 of the FFC 1'. The third portion 13 and the fourth portion 14 of the FFC 1' are not superposed on any part of the FFC 2', and a third portion 23 and a fourth portion 24 of the FFC 2' are not superposed on any part of the FFC 1'.

In the FFC 1', a shape of the part of the second portion 12 overlapping the first portion 11 (first overlapping portion) is triangular, a shape of the part of the second portion 12 overlapping the third portion 13 is trapezoidal, and a shape of the part of the third portion 13 overlapping the fourth portion 14 is triangular. In the FFC 2', a shape of the part of the second portion 22 overlapping the first portion 21 (second overlapping portion) is triangular, a shape of a part of the second portion 22 overlapping the third portion 23 is trapezoidal, and a shape of a part of the third portion 23 overlapping the fourth portion 24 is triangular.

When the first circuit substrates DA and DB and the second circuit substrate TC are connected via the FFCs 1' and 2' according to the second embodiment, the same effect as in the first embodiment can be obtained. That is, even when front faces of the first circuit substrates DA and DB face the backlight BL side, the connection work of the FFCs 1' and 2' can be performed with a front face of the second circuit substrate TC facing the opposite side of the backlight BL side (i.e., with the second connectors CA and CB visible to the operator), thereby suppressing a decrease in work efficiency in manufacturing a display device DS.

Third Embodiment

Figure 13:
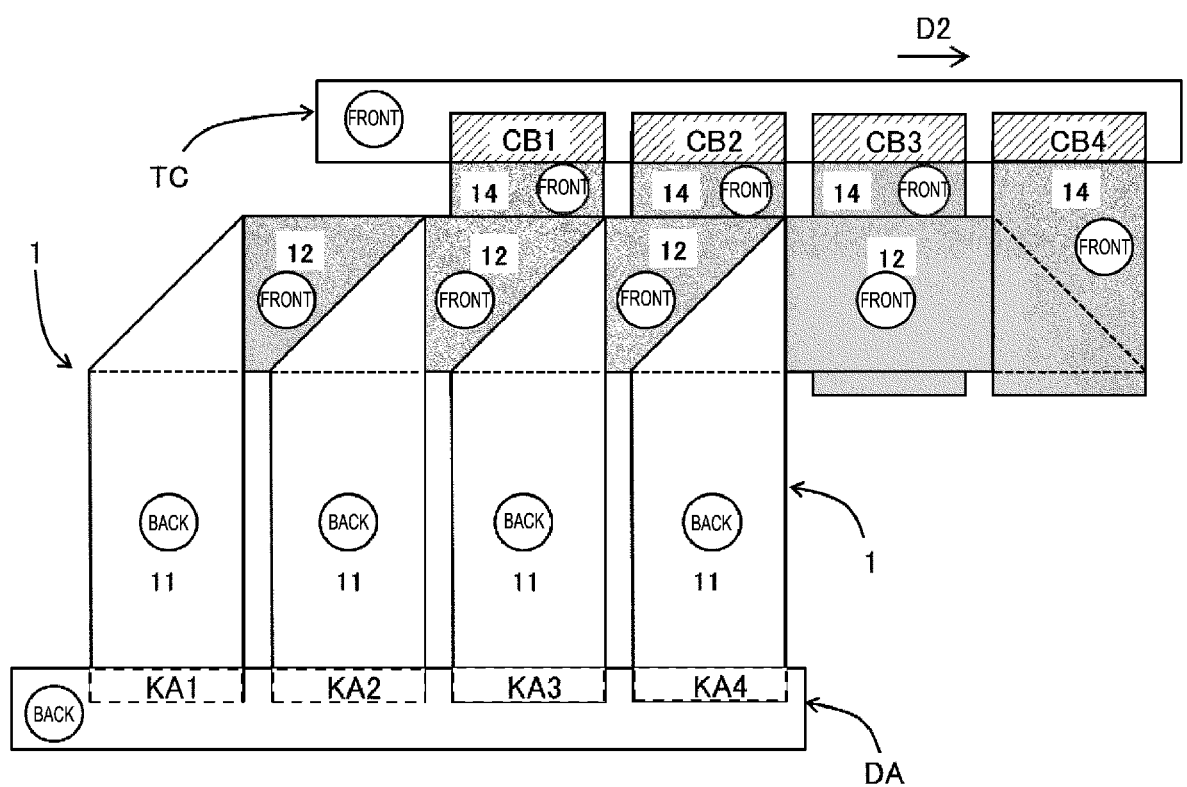
FIG. 13 is a plan view illustrating a connection configuration of a first circuit substrate and a second circuit substrate according to a third embodiment.

FIG. 13 is a plan view illustrating a connection configuration of a first circuit substrate and a second circuit substrate according to a third embodiment. A display device DS in FIG. 13 includes N (N is an integer of 2 or more in the present embodiment, and N=4 in an example in FIG. 13) first connectors KA1 to KA4 arranged in parallel in a predetermined direction (for example, an extending direction of scanning signal lines, hereinafter referred to as "D2 direction") when viewed from the backlight BL side (the back side of the paper in FIG. 13), N second connectors CB1 to CB4 arranged in parallel in the D2 direction when viewed from the backlight BL side, and N FFCs 1 arranged in parallel in the D2 direction when viewed from the backlight BL side. The N first connectors KA1 to KA4 are provided on one first circuit substrate DA, and the N second connectors CB1 to CB4 are provided on a second circuit substrate TC. Each of the N FFCs 1 is substantially the same as the FFC 1 according to the first embodiment. Each FFC 1 has a shield front face (gray portion in the figure) and a non-shielded back face.

An nth (n is an integer from 1 to 4) FFC 1 from one side in the D2 direction (e.g., the left side in the figure, and hereinafter referred to as "one side in the D2 direction") among the N FFCs 1 has a first end 1X connected to an nth first connector KAn from the one side in the D2 direction among the N first connectors KA1 to KA4, and has a second end 1Y connected to an nth second connector CBn from the one side in the direction D2 among the N second connectors CB1 to CB4. In each of the N FFCs 1, a first portion 11 is disposed closer on the one side in the D2 direction than a fourth portion 14. An mth (m is an integer from 2 to 4) FFC 1 from the one side in the D2 direction among the N FFCs 1 is superposed on an (m−1)th FFC 1 from the one side in the D2 direction among the N FFCs 1 so that a back face of a part of a second portion 12 of the mth FFC 1 that overlaps the first portion 11 of the mth FFC 1 (first overlapping portion) faces a front face of the second portion 12 of the (m−1)th FFC 1.

Thus, in the example in FIG. 13, the N FFCs 1 are superposed so that the non-shielded faces of the N FFCs 1 (back faces) do not face each other. Thus, interference between the wiring lines can be reduced. By superposing the N FFCs 1 so that the first overlapping portions of the N FFCs 1 are not superposed on each other, the total thickness of the N FFCs 1 can be reduced.

Figure 14:
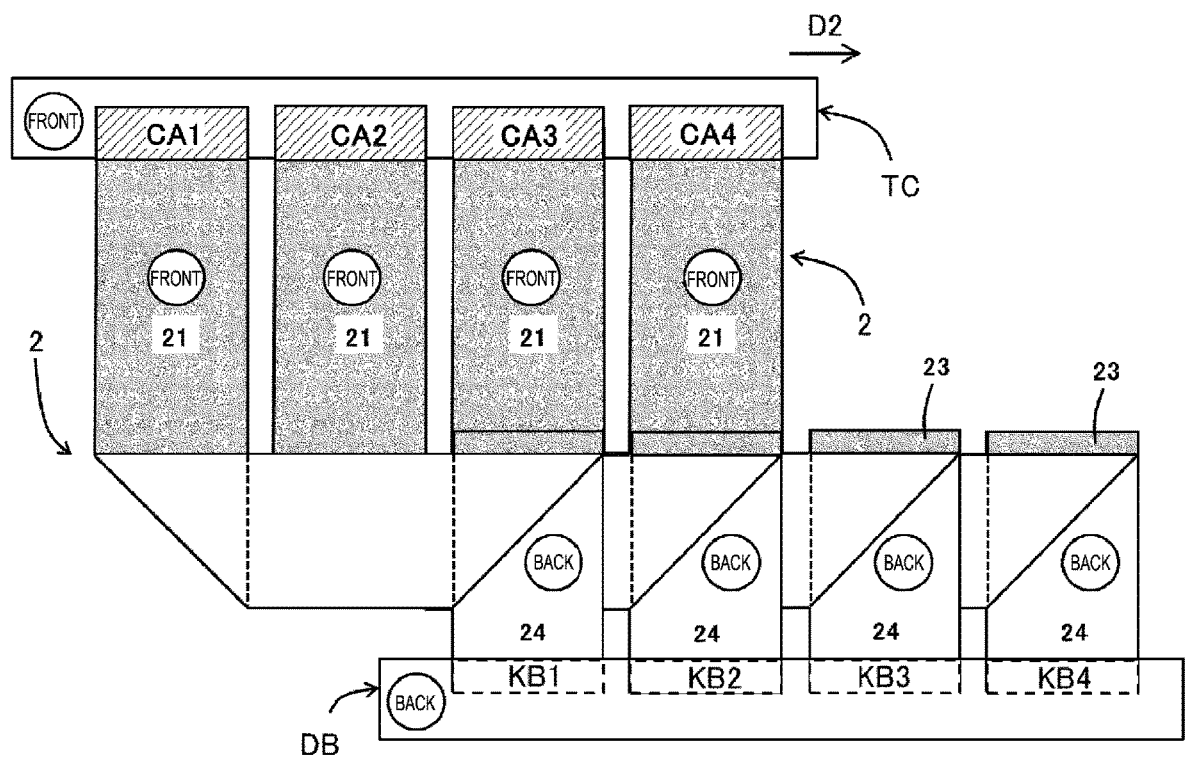
FIG. 14 is a plan view illustrating another connection configuration of a first circuit substrate and the second circuit substrate according to the third embodiment.

FIG. 14 is a plan view illustrating another connection configuration of a first circuit substrate and the second circuit substrate according to the third embodiment. A display device DS in FIG. 14 includes N (N is an integer of 2 or more in the present embodiment, and N=4 in an example in FIG. 14) first connectors KB1 to KB4 arranged in parallel in the D2 direction when viewed from the backlight BL side (the back side of the paper in FIG. 14), N second connectors CA1 to CA4 arranged in parallel in the D2 direction when viewed from the backlight BL side, and N FFCs 2 arranged in parallel in the D2 direction when viewed from the backlight BL side. The N first connectors KB1 to KB4 are provided on one first circuit substrate DB, and the N second connectors CA1 to CA4 are provided on the second circuit substrate TC. Each of the N FFCs 2 is substantially the same as the FFC 2 according to the first embodiment. Each FFC 2 has a shield front face (gray portion in the figure) and a non-shielded back face.

An nth (n is an integer from 1 to 4) FFC 2 from the one side in the D2 direction among the N FFCs 2 has a first end 2X connected to an nth first connector KBn from the one side in the D2 direction among the N first connectors KB1 to KB4, and has a second end 2Y connected to an nth second connector CAn from the one side in the D2 direction among the N second connectors CA1 to CA4. In each of the N FFCs 2, a first portion 21 is disposed closer on the one side in the D2 direction than a fourth portion 24. An mth (m is an integer from 2 to 4) FFC 2 from the one side in the D2 direction among the N FFCs 2 is superposed on an (m−1)th FFC 2 from the one side in the D2 direction among the N FFCs 2 so that a back face of a part of a second portion 22 of the mth FFC 2 that overlaps the first portion 21 of the mth FFC 2 (second overlapping portion) faces a front face of the second portion 22 of the (m−1)th FFC 2.

Thus, in the example in FIG. 14, the N FFCs 2 are superposed so that the non-shielded faces of the N FFCs 2 (back faces) do not face each other. Thus, interference between the wiring lines can be reduced. By superposing the N FFCs 2 so that the second overlapping portions of the N FFCs 2 are not superposed on each other, the total thickness of the N FFCs 2 can be reduced.

As illustrated in FIGS. 13 and 14, the first circuit substrate DA, DB is connected to the second circuit substrate TC via the N FFCs 1, 2 with front face of the first circuit substrate DA, DB (mounting face of the first connectors KA1 to KA4, KB1 to KB4) facing the backlight BL side and a front face of the second circuit substrate TC (mounting face of the second connectors CA1 to CA4, CB1 to CB4) facing the opposite side of the backlight BL side. Accordingly, also in the present embodiment, similar effects as in the first embodiments can be obtained. That is, even when the front face of the first circuit substrate DA, DB face the backlight BL side, the connection work of the FFCs 1, 2 can be performed with the front face of the second circuit substrate TC facing the opposite side of the backlight BL side (i.e., with the second connectors CA1 to CA4, CB1 to CB4 visible to the operator), thereby suppressing a decrease in work efficiency in manufacturing the display device DS.

Fourth Embodiment

Figure 15:
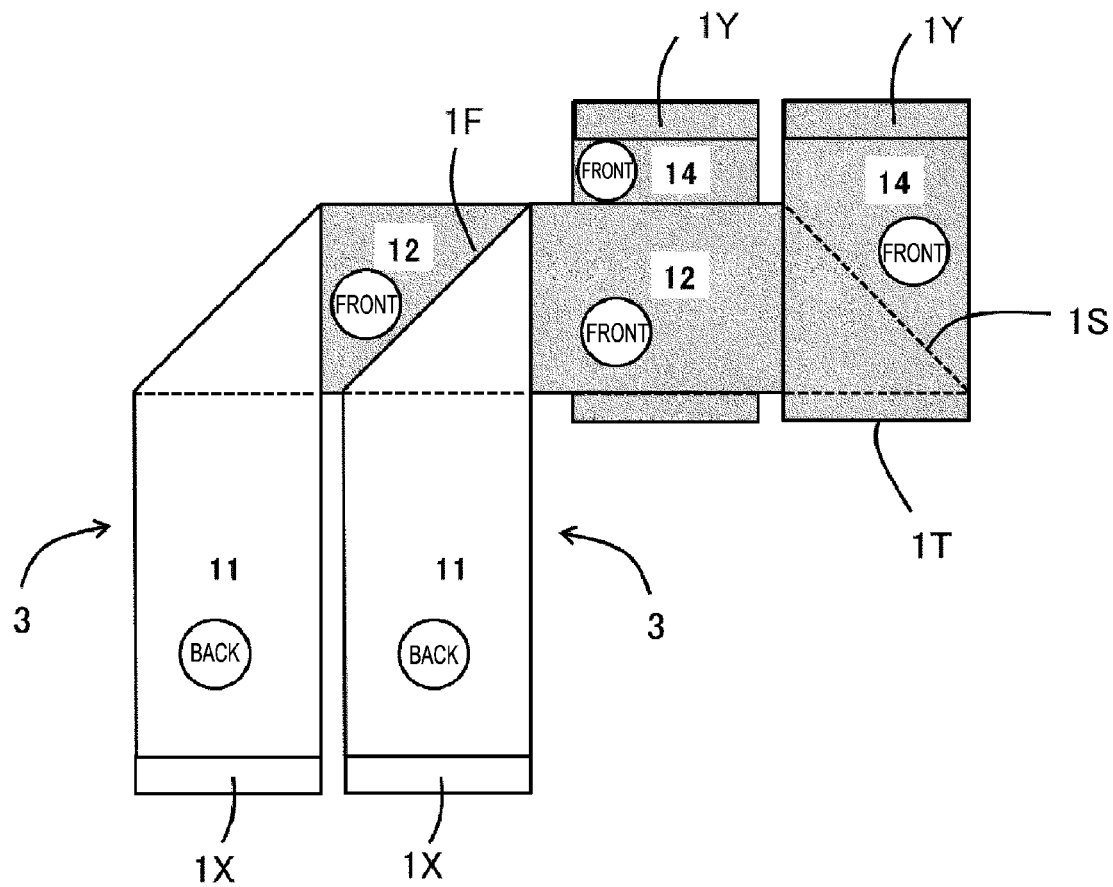
FIG. 15 is a plan view illustrating a configuration of FFCs according to a fourth embodiment.
Figure 16:
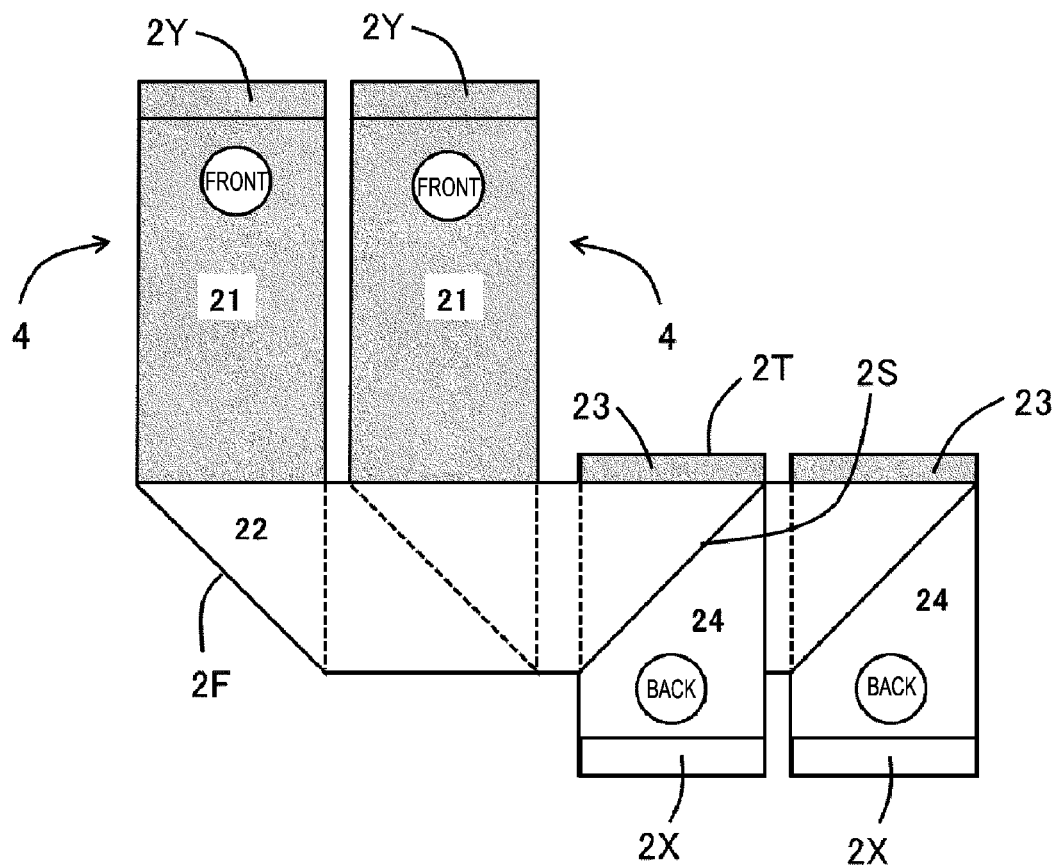
FIG. 16 is a plan view illustrating a configuration of FFCs according to the fourth embodiment.
Figure 17:
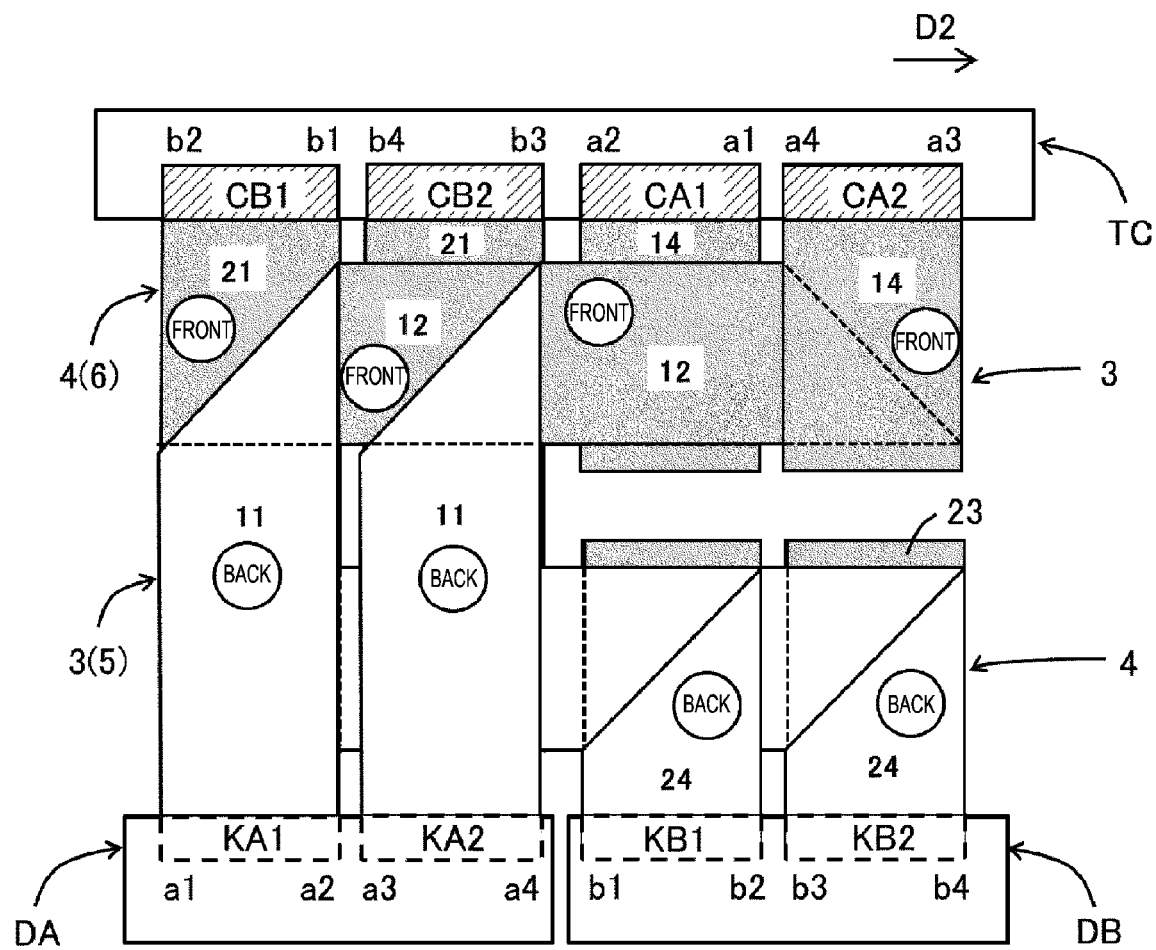
FIG. 17 is a plan view illustrating a connection configuration of first circuit substrates and a second circuit substrate according to the fourth embodiment.

FIGS. 15 and 16 are plan views illustrating configurations of FFCs according to a fourth embodiment. FIG. 17 is a plan view illustrating a connection configuration of first circuit substrates and a second circuit substrate according to the fourth embodiment. A display device DS in FIG. 17 includes N (N is an even number of 4 or more in the present embodiment, and N=4 in an example in FIG. 17) first connectors KA1, KA2, KB1, and KB2 arranged in parallel in a D2 direction when viewed from the backlight BL side (the back side of the paper in FIG. 17), N second connectors CB1, CB2, CA1, and CA2 arranged in parallel in the D2 direction when viewed from the backlight BL side, and N/2 FFCs 3 arranged in parallel in the D2 direction when viewed from the backlight BL side, and N/2 FFCs 4 arranged in parallel in the D2 direction when viewed from the backlight BL side. Among the N first connectors KA1, KA2, KB1, and KB2, two first connectors KA1 and KA2 are provided on a first circuit substrate DA, and the other two first connectors KB1 and KB2 are provided on a first circuit substrate DB. The N second connectors CB1, CB2, CA1, and CA2 are all provided on a second circuit substrate TC. Each of the N/2 FFCs 3 is substantially the same as the FFC 1 according to the first embodiment, and each of the N/2 FFCs 4 is substantially the same as the FFC 2 according to the first embodiment. Constituent elements of the FFC 3 are denoted by the same reference numerals as the constituent elements of the FFC 1, and constituent elements of the FFC 4 are denoted by the same reference numerals as the constituent elements of the FFC 2. The N/2 FFCs 3 and the N/2 FFCs 4 have the same shape. With front and back faces of the N/2 FFCs 3 reversed to front and back faces of the N/2 FFCs 4, the N/2 FFCs 3 and the N/2 FFCs 4 are connected to the first circuit substrates DA and DB and the second circuit substrate TC. The FFCs 3 and 4 each have shield front faces (gray portions in the figure) and non-shielded back faces.

The N/2 FFCs 3 and the N/2 FFCs 4 are disposed so as to intersect each other, and are connected to the N first connectors KA1, KA2, KB1, and KB2 of the first circuit substrates DA and DB and the N second connectors CB1, CB2, CA1, and CA2 of the second circuit substrate TC as follows. That is, an nth (n is an integer from 1 to N/2) FFC 3 from one side in the D2 direction (left side in the figure) of the N/2 FFCs 3 has a first end 1X connected to an nth first connector KAn from the one side in the D2 direction among the N first connectors KA1, KA2, KB1, and KB2, and has a second end 1Y connected to an (n+N/2)th second connector CAn from the one side in the D2 direction among the N second connectors CB1, CB2, CA1, and CA2. Further, an nth FFC 4 from the one side in the D2 direction of the N/2 FFCs 4 has a first end 2X connected to an (n+N/2)th first connector KBn from the one side in the D2 direction among the N first connectors KA1, KA2, KB1, and KB2, and has a second end 2Y connected to an nth second connector CBn from the one side in the D2 direction among the N second connectors CB1 CB2, CA1, and CA2.

In the N/2 FFCs 3, a first portion 11 is disposed closer on the one side in the D2 direction than a fourth portion 14, and in the N/2 FFCs 4, a first portion 21 is disposed closer on the one side in the D2 direction than a fourth portion 24. An mth (m is an integer from 2 to N/2) FFC 3 from the one side in the D2 direction of the N/2 FFCs 3 is superposed on an (m−1)th FFC 3 from the one side in the D2 direction of the N/2 FFCs 3 so that a back face of a part of a second portion 12 of the mth FFC 3 that overlaps the first portion 11 of the mth FFC 3 (first overlapping portion) faces a front face of the second portion 12 of the (m−1)th FFC 3. An mth FFC 4 from the one side in the D2 direction of the N/2 FFCs 4 is superposed on an (m−1)th FFC 4 from the one side in the D2 direction of the N/2 FFCs 4 so that a back face of a part of a second portion 22 of the mth FFC 4 that overlaps the first portion 21 of the mth FFC 4 (second overlapping portion) faces a front face of the second portion 22 of the (m−1)th FFC 4.

In FIG. 17, the N/2 FFCs 3 are superposed on the N/2 FFCs 4 so that a back face of the part of the second portion 12 of the FFC 3 closest to the one side in the D2 direction (hereinafter referred to as "FFC 5") of the N/2 FFCs 3 that overlaps the first portion 11 of the FFC 5 (first overlapping portion) faces a front face of the first portion 21 of the FFC 4 closest to the one side in the D2 direction (hereinafter referred to as "FFC 6") of the N/2 FFCs 4, and a back face of the part of the second portion 22 of the FFC 6 that overlaps the first portion 21 of the FFC 6 (second overlapping portion) faces a front face of the first portion 11 of the FFC 5. Further, third portions 13 and the fourth portions 14 of the N/2 FFCs 3 are not superposed on any part of the N/2 FFCs 4, and third portions 23 and the fourth portions 24 of the N/2 FFCs 4 are not superposed on any part of the N/2 FFCs 3.

Thus, in the present embodiment, the N/2 FFCs 3 are superposed on the N/2 FFCs 4 so that non-shielded faces (back faces) thereof do not face each other. Thus, interference between the wiring lines can be reduced. Further, by superposing the N/2 FFCs 3 on the N/2 FFCs 4 so that the first overlapping portions of the N/2 FFCs 3 are not superposed on the second overlapping portions of the N/2 FFCs 4, the total thickness of the N/2 FFCs 3 and N/2 FFCs 4 can be reduced.

As illustrated in FIG. 17, the first circuit substrates DA and DB and the second circuit substrate TC are connected via the N/2 FFCs 3 and N/2 FFCs 4 with front faces of the first circuit substrates DA and DB (mounting faces of the first connectors KA1, KA2, KB1, and KB2) facing the backlight BL side and a front face of the second circuit substrate TC (mounting face of the second connectors CB1, CB2, CA1, and CA2) facing the opposite side of the backlight BL side. Accordingly, also in the present embodiment, similar effects as in the first embodiments can be obtained. That is, even when the front faces of the first circuit substrates DA and DB face the backlight BL side, the connection work of the FFCs 3 and 4 can be performed with the front face of the second circuit substrate TC facing the opposite side of the backlight BL side (i.e., with the second connectors CB1, CB2, CA1, and CA2 visible to the operator), thereby suppressing a decrease in work efficiency in manufacturing the display device DS.

Fifth Embodiment

Figure 18:
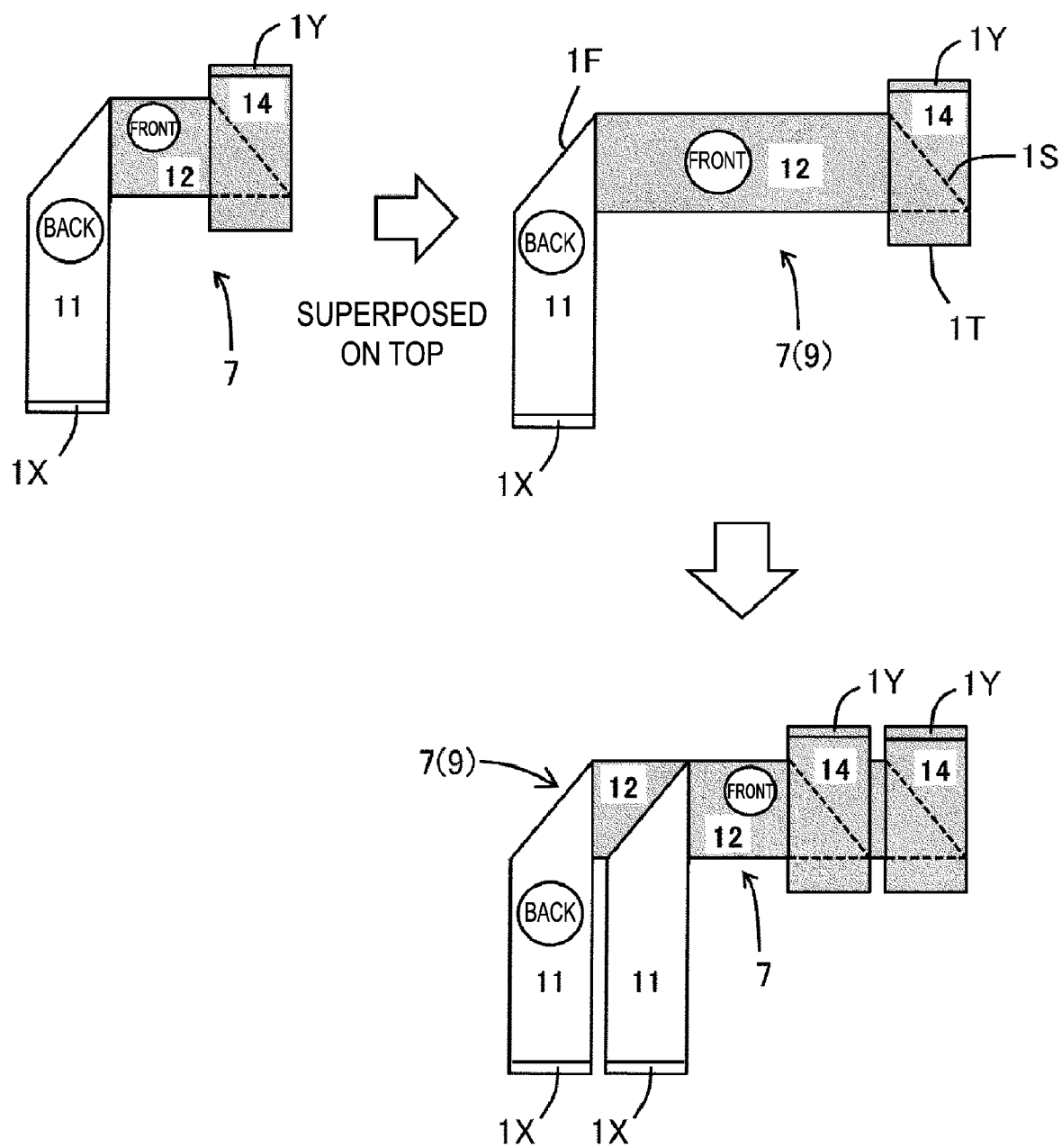
FIG. 18 is a plan view illustrating a configuration of FFCs according to a fifth embodiment.
Figure 19:
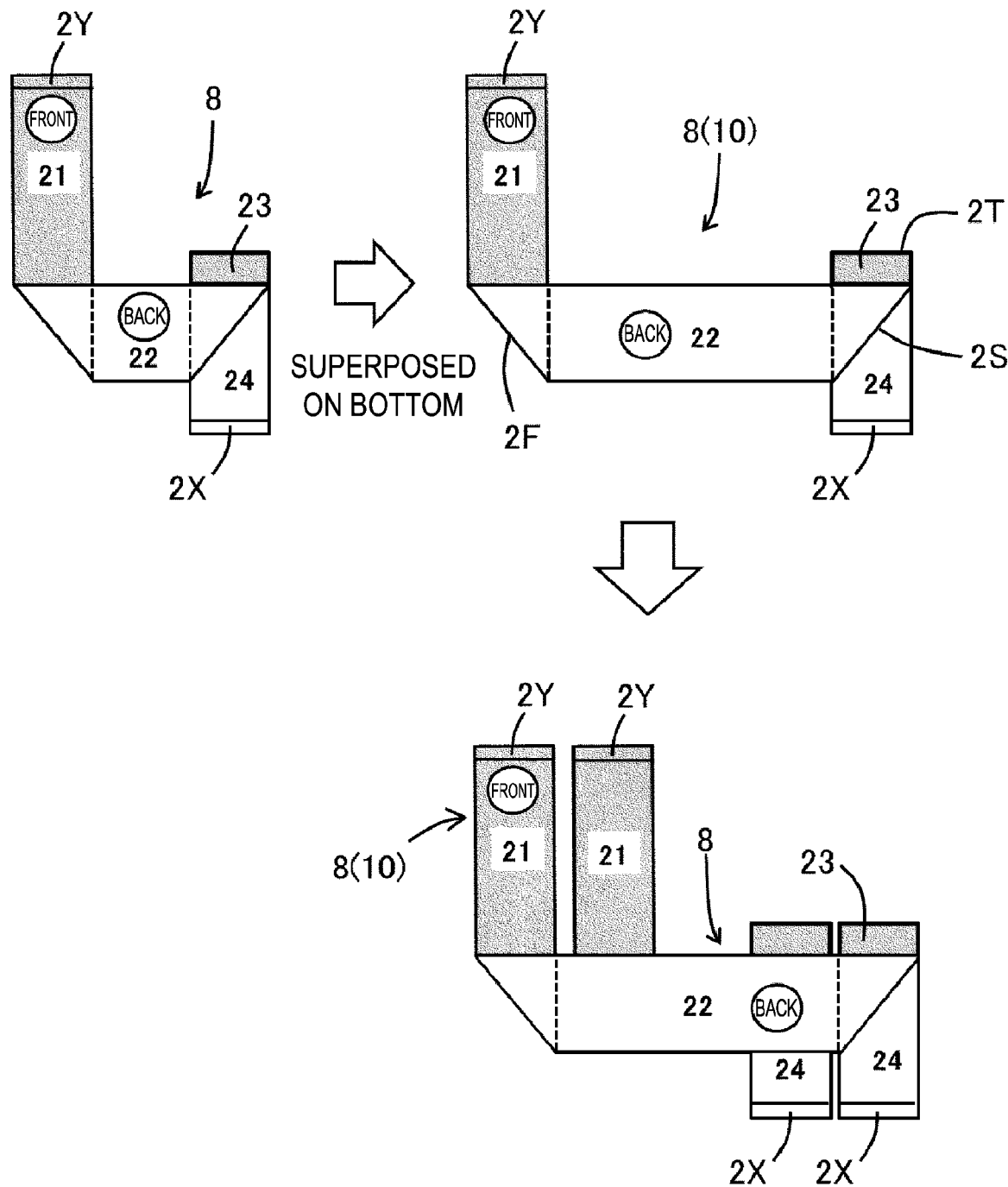
FIG. 19 is a plan view illustrating a configurations of FFCs according to the fifth embodiment.
Figure 20:
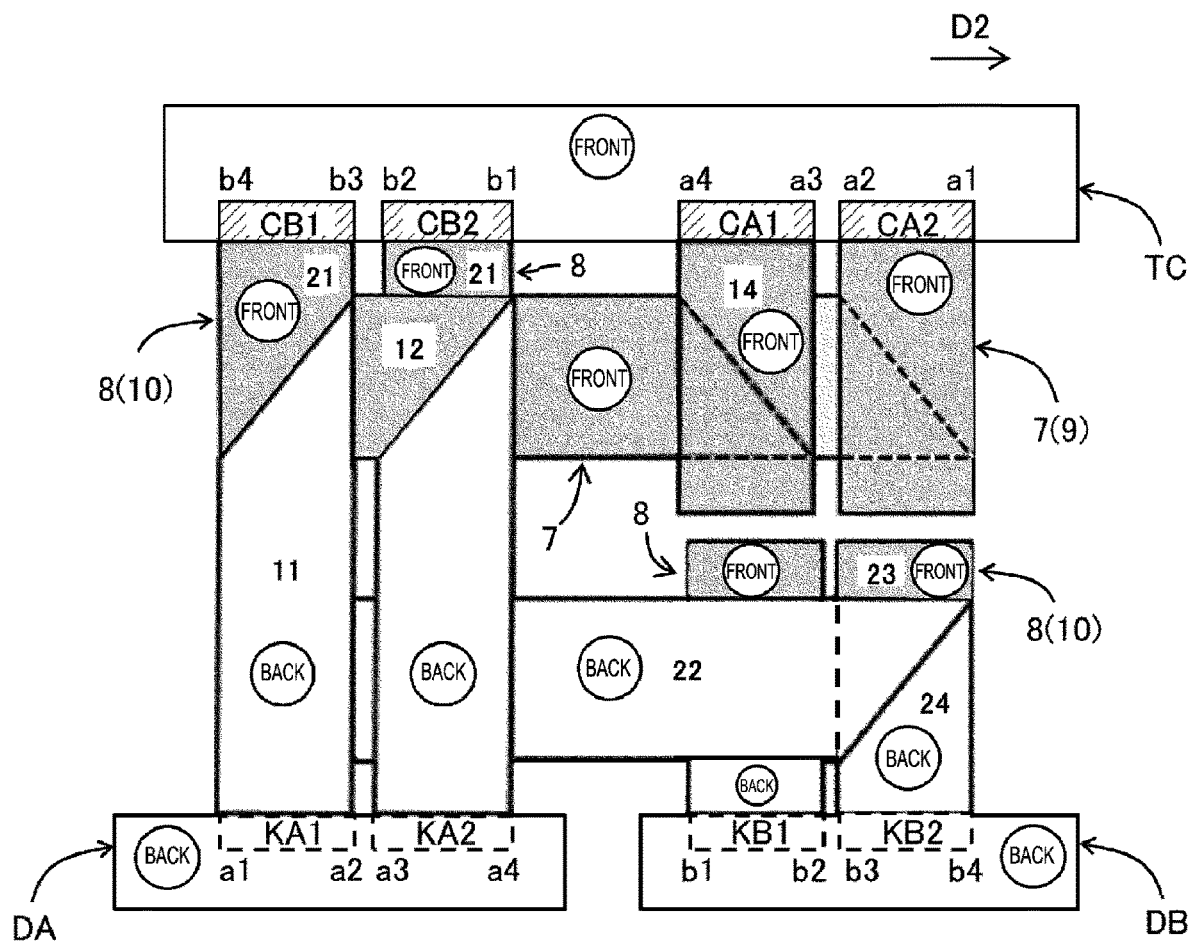
FIG. 20 is a plan view illustrating a connection configuration of first circuit substrates and a second circuit substrate according to the fifth embodiment.

FIGS. 18 and 19 are plan views illustrating configurations of FFCs according to a fifth embodiment. FIG. 20 is a plan view illustrating a connection configuration of first circuit substrates and a second circuit substrate according to the fifth embodiment. A display device DS in FIG. 20 includes N (N is an even number of 4 or more in the present embodiment, and N=4 in an example in FIG. 20) first connectors KA1, KA2, KB1, and KB2 arranged in parallel in a D2 direction when viewed from the backlight BL side (the back side of the paper in FIG. 20), N second connectors CB1, CB2, CA1 and CA2 arranged in parallel in the D2 direction when viewed from the backlight BL side, N/2 FFCs 7 arranged in parallel in the D2 direction when viewed from the backlight BL side, and N/2 FFCs 8 arranged in parallel in the D2 direction when viewed from the backlight BL side. As in the fourth embodiment, among the N first connectors KA1, KA2, KB1, and KB2, two first connectors KA1 and KA2 are provided on a first circuit substrate DA, and the other two first connectors KB1 and KB2 are provided on a first circuit substrate DB. The N second connectors CB1, CB2, CA1, and CA2 are all provided on a second circuit substrate TC. Each of the N/2 FFCs 7 is substantially the same as the FFC 1 according to the first embodiment except for a length of a second portion, and each of the N/2 FFCs 8 is substantially the same as the FFC 2 according to the first embodiment except for a length of a second portion. Constituent elements of the FFC 7 are denoted by the same reference numerals as the constituent elements of the FFC 1, and constituent elements of the FFC 8 are denoted by the same reference numerals as the constituent elements of the FFC 2. Each of the N/2 FFCs 7 has the second portion 12 of different length, and each of the N/2 FFCs 8 has the second portion 22 of different length. The FFCs 7 and 8 each have shield front faces and non-shielded back faces.

The N/2 FFCs 7 and the N/2 FFCs 8 are disposed so as to intersect each other, and are connected to the N first connectors KA1, KA2, KB1, and KB2 of the first circuit substrates DA and DB and the N second connectors CB1, CB2, CA1, and CA2 of the second circuit substrate TC as follows. That is, the FFC 7 having an nth (n is an integer from 1 to N/2) longest second portion 12 of the N/2 FFCs 7 has a first end 1X connected to an nth first connector KAn from one side in the D2 direction among the N first connectors KA1, KA2, KB1, and KB2, and has a second end 1Y connected to an nth second connector CAn from the other side (right side in the figure) in the D2 direction among the N second connectors CB1, CB2, CA1, and CA2. The FFC 8 having an nth longest second portion 22 of the N/2 FFCs 8 has a first end 2X connected to an nth first connector KBn from the other side in the D2 direction among the N first connectors KA1, KA2, KB1, and KB2, and has a second end 2Y connected to an nth second connector CBn from the one side in the D2 direction among the N second connectors CB1, CB2, CA1, and CA2.

As illustrated in FIGS. 18 and 20, the FFC 7 having an mth (m is an integer from 2 to N/2) longest second portion 12 of the N/2 FFCs 7 is superposed on the FFC 7 having an (m−1)th longest second portion 12 of the N/2 FFCs 7 so that a back face of the second portion 12 of the FFC 7 having the mth longest second portion 12 faces a front face of the second portion 12 of the FFC 7 having the (m−1)th longest second portion 12. As illustrated in FIGS. 19 and 20, the FFC 8 having an mth longest second portion 22 of the N/2 FFCs 8 is superposed on the FFC 8 having an (m−1)th longest second portion 22 of the N/2 FFCs 8 so that a back face of the second portion 22 of the FFC 8 having the mth longest second portion 22 faces a front face of the second portion 22 of the FFC 8 having the (m−1)th longest second portion 22.

As illustrated in FIG. 20, the N/2 FFCs 7 are superposed on the N/2 FFCs 8 so that a back face of a part of the second portion 12 of the FFC 7 having the longest second portion 12 of the N/2 FFCs 7 (hereinafter referred to as "FFC 9") that overlaps the first portion 11 of the FFC 9 (first overlapping portion) faces a front face of the first portion 21 of the FFC 8 having the longest second portion 22 of the N/2 FFCs 8 (hereinafter referred to as "FFC 10") and a back face of a part of the second portion 22 of the FFC 10 that overlaps the first portion 21 of the FFC 10 (second overlapping portion) faces a front face of the first portion 11 of the FFC 9. Further, third portions 13 and fourth portions 14 of the N/2 FFCs 7 are not superposed on any part of the N/2 FFCs 8, and third portions 23 and fourth portions 24 of the N/2 FFCs 8 are not superposed on any part of the N/2 FFCs 7.

Thus, in the present embodiment, the N/2 FFCs 7 are superposed on the N/2 FFCs 8 so that non-shielded faces (back faces) thereof do not face each other. Thus, interference between the wiring lines can be reduced. Further, by superposing the N/2 FFCs 7 on the N/2 FFCs 8 so that the first overlapping portions of the N/2 FFCs 7 are not superposed on the second overlapping portions of the N/2 FFCs 8, the total thickness of the N/2 FFCs 7 and the N/2 FFCs 8 can be reduced. Furthermore, the connection relationship between a plurality of terminals included in the first connectors KA1, KA2, KB1, and KB2 and a plurality of terminals included in the second connectors CB1, CB2, CA1, and CA2 is the same as in a known case in which the FFCs are directly connected without being bent with the front faces of the first circuit substrates and the front face of the second circuit substrate facing the same side. Therefore, there is no need to perform special processing such as left-right inversion of the image.

As illustrated in FIG. 20, the first circuit substrates DA and DB and the second circuit substrate TC are connected via the N/2 FFCs 7 and the N/2 FFCs 8 with front faces of the first circuit substrates DA and DB (mounting faces of the first connectors KA1, KA2, KB1, and KB2) facing the backlight BL side and a front face of the second circuit substrate TC (mounting face of the second connectors CB1, CB2, CA1, and CA2) facing the opposite side of the backlight BL side. Accordingly, also in the present embodiment, similar effects as in the first embodiments can be obtained. That is, even when the front faces of the first circuit substrates DA and DB face the backlight BL side, the connection work of the FFCs 7 and 8 can be performed with the front face of the second circuit substrate TC facing the opposite side of the backlight BL side (i.e., with the second connectors CB1, CB2, CA1, and CA2 visible to the operator), thereby suppressing a decrease in work efficiency in manufacturing the display device DS.

The embodiments described above are for the purpose of illustration and description and are not intended to be limiting. It will be apparent to those skilled in the art that many variations will be possible in accordance with these examples and descriptions.

In each embodiment described above, for example, a case in which the FFC includes four portions (first portion 11, 21, second portion 12, 22, third portion 13, 23, and fourth portion 14, 24) is described as an example; however, the FFC may further include another portion in addition to the four portions in each embodiment. The first portion 11, 21 may be a portion from a given position on a side of the one end to the first bending position 1F, 2F, and the FFC may include another portion between the one end and the given position, for example. Furthermore, the fourth portion 14, 24 may be a portion from the third bending position 1T, 2T to a given position on a side of the other end, and the FFC may include another portion between the given position and the other end.

What is claimed is:

1. A display device comprising:
a display panel;
a backlight configured to illuminate the display panel;

at least one first circuit substrate including at least one first connector and disposed near the backlight with a front face of the at least one first circuit substrate on which the at least one first connector is mounted facing a backlight side;

a second circuit substrate being a circuit substrate that includes at least one second connector and is disposed near the backlight with a back face opposite to a front face of the second circuit substrate on which the at least one second connector is mounted facing the backlight side, and being connected to the display panel via the at least one first circuit substrate; and at least one flexible flat cable (FFC) connecting the at least one first circuit substrate and the second circuit substrate, wherein by bending at a plurality of bending positions, one of a front face and a back face at a first end of the at least one FFC faces the backlight side and another of the front face and the back face at a second end of the at least one FFC faces the backlight side, the first end is connected to the at least one first connector, and the second end is connected to the at least one second connector.

2. The display device according to claim 1, wherein the plurality of bending positions includes a first bending position, a second bending position, and a third bending position, the at least one FFC includes a first portion from one end or a given position on a side of one end to the first bending position, a second portion from the first bending position to the second bending position, a third portion from the second bending position to the third bending position, and a fourth portion from the third bending position to another end or a given position on a side of another end, the one end is the first end and the other end is the second end, or the one end is the second end and the other end is the first end, and by bending the at least one FFC at the plurality of bending positions, front faces of the first portion and the third portion and back faces of the second portion and the fourth portion face the backlight side, or back faces of the first portion and the third portion and front faces of the second portion and the fourth portion face the backlight side.

3. The display device according to claim 2, wherein the at least one FFC includes a plurality of wiring lines extending in parallel from the first end to the second end, and assuming that a direction in which the plurality of wiring lines extend is a first direction, when an end portion of the first portion on a second portion side is viewed in a plan view, the first direction at the end portion of the first portion on the second portion side is substantially orthogonal to the first direction at an end portion of the second portion on a first portion side, when an end portion of the second portion on a third portion side is viewed in a plan view, the first direction at the end portion of the second portion on the third portion side is substantially orthogonal to the first direction at an end portion of the third portion on a second portion side, and when an end portion of the third portion on a fourth portion side is viewed in a plan view, the first direction at the end portion of the third portion on the fourth portion side is substantially antiparallel to the first direction at an end portion of the fourth portion on a third portion side.

4. The display device according to claim 2, wherein in the at least one FFC, by bending at the first bending position, a part of the front face of the first portion faces a part of the front face of the second portion, by bending at the second bending position, another part of the front face of the second portion faces a part of the front face of the third portion, and by bending at the third bending position, the back face of the third portion faces a part of the back face of the fourth portion.

5. The display device according to claim 2, wherein shapes of the first portion, the second portion, and the third portion are trapezoidal, and a shape of the fourth portion is rectangular.

6. The display device according to claim 2, wherein the at least one FFC includes a plurality of wiring lines extending in parallel from the first end to the second end, and assuming that a direction in which the plurality of wiring lines extend is a first direction, when an end portion of the first portion on a second portion side is viewed in a plan view, the first direction at the end portion of the first portion on the second portion side is substantially orthogonal to the first direction at an end portion of the second portion on a first portion side, when an end portion of the second portion on a third portion side is viewed in a plan view, the first direction at the end portion of the second portion on the third portion side is substantially antiparallel to the first direction at an end portion of the third portion on a second portion side, and when an end portion of the third portion on a fourth portion side is viewed in a plan view, the first direction at the end portion of the third portion on the fourth portion side is substantially orthogonal to the first direction at an end portion of the fourth portion on a third portion side.

7. The display device according to claim 2, wherein in the at least one FFC, by bending at the first bending position, a part of the front face of the first portion faces a part of the front face of the second portion, by bending at the second bending position, a part of the back face of the second portion faces the back face of the third portion, and by bending at the third bending position, a part of the front face of the third portion faces a part of the front face of the fourth portion.

8. The display device according to claim 2, wherein shapes of the first portion, the second portion, the third portion, and the fourth portion are each trapezoidal.

9. The display device according to claim 2, wherein the at least one first connector includes two first connectors, the at least one second connector includes two second connectors, the at least one FFC includes two FFCs, a first FFC and a second FFC, the first end of the first FFC is connected to one of the two first connectors, the second end of the first FFC is connected to one of the two second connectors, the first end of the second FFC is connected to another of the two first connectors, the second end of the second FFC is connected to another of the two second connectors, and the first FFC and the second FFC are disposed in a crossed state.

10. The display device according to claim 9, wherein by superposing the first FFC on the second FFC, a back face of a part of the second portion of the first FFC faces a front face of the first portion of the second FFC, the part of the second portion of the first FFC overlapping the first portion of the first FFC, and a back face of a part of the second portion of the second FFC faces a front face of the first portion of the first FFC, the part of the second portion of the second FFC overlapping the first portion of the second FFC.

11. The display device according to claim 10, wherein the third portion and the fourth portion of the first FFC are not superposed on any part of the second FFC, and the third portion and the fourth portion of the second FFC are not superposed on any part of the first FFC.

12. The display device according to claim 2, wherein the at least one first connector includes N (N is an integer of 2 or more) first connectors arranged in parallel in a second direction when viewed from the backlight side, the at least one second connector includes N second connectors arranged in parallel in the second direction when viewed from the backlight side, the at least one FFC includes N FFCs arranged in parallel in the second direction when viewed from the backlight side, the first end of an nth (n is an integer from 1 to N) FFC from one side in the second direction of the N FFCs is connected to an nth first connector from the one side in the second direction of the N first connectors, and the second end of the nth FFC is connected to an nth second connector from the one side in the second direction of the N second connectors, in each of the N FFCs, the first portion is disposed closer to the one side than the fourth portion, and by superposing an mth (m is an integer from 2 to N) FFC from the one side in the second direction of the N FFCs on an (m−1)th FFC from the one side in the second direction of the N FFCs, a back face of a part of the second portion of the mth FFC faces a front face of the second portion of the (m−1)th FFC, the part of the second portion of the mth FFC overlapping the first portion of the mth FFC.

13. The display device according to claim 2, wherein the at least one first connector includes N (N is an even number of 4 or more) first connectors arranged in parallel in a second direction when viewed from the backlight side, the at least one second connector includes N second connectors arranged in parallel in the second direction when viewed from the backlight side, the at least one FFC includes N/2 third FFCs arranged in parallel in the second direction when viewed from the backlight side and N/2 fourth FFCs arranged in parallel in the second direction when viewed from the backlight side, the N/2 third FFCs and the N/2 fourth FFCs have the same shape, the first end of an nth (n is an integer from 1 to N/2) third FFC from one side in the second direction of the N/2 third FFCs is connected to an nth first connector from the one side in the second direction among the N first connectors, and the second end of the nth third FFC is connected to an (n+N/2)th second connector from the one side in the second direction among the N second connectors, the first end of an nth fourth FFC from the one side in the second direction of the N/2 fourth FFCs is connected to an (n+N/2)th first connector from the one side in the second direction among the N first connectors, and the second end of the nth fourth FFC is connected to an nth second connector from the one side in the second direction among the N second connectors, and the third FFCs and the fourth FFCs are disposed in a crossed state.

14. The display device according to claim 13, wherein in each of the N/2 third FFCs and the N/2 fourth FFCs, the first portion is disposed closer on the one side than the fourth portion, by superposing an mth (m is an integer from 2 to N/2) third FFC from the one side in the second direction of the N/2 third FFCs on an (m−1)th third FFC from the one side in the second direction of the N/2 third FFCs, a back face of a part of the second portion of the mth third FFC faces a front face of the second portion of the (m−1)th third FFC, the part of the second portion of the mth third FFC overlapping the first portion of the mth third FFC, and by superposing an mth fourth FFC from the one side in the second direction of the N/2 fourth FFCs on an (m−1)th fourth FFC from the one side in the second direction of the N/2 fourth FFCs, a back face of a part of the second portion of the mth fourth FFC faces a front face of the second portion of the (m−1)th fourth FFC, the part of the second portion of the mth fourth FFC overlapping the first portion of the mth fourth FFC.

15. The display device according to claim 14, wherein one of the N/2 third FFCs closest to the one side in the second direction is a fifth FFC, one of the N/2 fourth FFCs closest to the one side in the second direction is a sixth FFC, and by superposing the third FFCs on the fourth FFCs, a back face of a part of the second portion of the fifth FFC faces a front face of the first portion of the sixth FFC, the part of the second portion of the fifth FFC overlapping the first portion of the fifth FFC, and a back face of a part of the second portion of the sixth FFC faces a front face of the first portion of the fifth FFC, the part of the second portion of the sixth FFC overlapping the first portion of the sixth FFC.

16. The display device according to claim 2, wherein the at least one first connector includes N (N is an even number of 4 or more) first connectors arranged in parallel in a second direction when viewed from the backlight side, the at least one second connector includes N second connectors arranged in parallel in the second direction when viewed from the backlight side, the at least one FFC includes N/2 seventh FFCs arranged in parallel in the second direction when viewed from the backlight side and N/2 eighth FFCs arranged in parallel in the second direction when viewed from the backlight side, each of the N/2 seventh FFCs has the second portion of different length, each of the N/2 eighth FFCs has the second portion of different length, the first end of the seventh FFC having nth (n is an integer from 1 to N/2) longest second portion of the N/2 seventh FFCs is connected to an nth first connector from one side in the second direction among the N first connectors, and the second end of the seventh FFC having the nth longest second portion is connected to an nth second connector from another side in the second direction among the N second connectors, the first end of the eighth FFC having nth longest second portion of the N/2 eighth FFCs is connected to an nth first connector from the other side in the second direction among the N first connectors, and the second end of the eighth FFC having the nth longest second portion is connected to an nth second connector from the one side in the second direction among the N second connectors, and the seventh FFCs and the eighth FFCs are disposed in a crossed state.

17. The display device according to claim 16, wherein by superposing the seventh FFC having an mth (m is an integer from 2 to N/2) longest second portion of the N/2 seventh FFCs on the seventh FFC having a (m−1)th longest second portion of the N/2 seventh FFCs, a back face of the second portion of the seventh FFC having the mth longest second portion faces a front face of the second portion of the seventh FFC having the (m−1)th longest second portion, and by superposing the eighth FFC having an mth longest second portion of the N/2 eighth FFCs on the eighth FFC having a (m−1)th longest second portion of the N/2 eighth FFCs, a back face of the second portion of the eighth FFC having the mth longest second portion faces a front face of the second portion of the eighth FFC having the (m−1)th longest second portion.

18. The display device according to claim 17, wherein one of the N/2 seventh FFCs having the longest second portion is a ninth FFC, one of the N/2 eighth FFCs having the longest second portion is a tenth FFC, and by superposing the seventh FFCs on the eighth FFCs, a back face of a part of the second portion of the ninth FFC faces a front face of the first portion of the tenth FFC, the part of the second portion of the ninth FFC overlapping the first portion of the ninth FFC, and a back face of a part of the second portion of the tenth FFC faces a front face of the first portion of the ninth FFC, the part of the second portion of the tenth FFC overlapping the first portion of the tenth FFC.

19. The display device according to claim 1, wherein the front face of the at least one FFC is a shield face, and the back face of the at least one FFC is a non-shielded face.

20. The display device according to claim 1, wherein the display panel includes an active matrix substrate, a color filter substrate, and a liquid crystal layer sandwiched between the active matrix substrate and the color filter substrate, the color filter substrate is disposed closer to the backlight than the active matrix substrate, and the at least one first circuit substrate is connected to an end portion of a face of the active matrix substrate on the backlight side via a flexible wiring substrate.

* * * * *